United States Patent
Son et al.

(10) Patent No.: US 10,567,755 B2
(45) Date of Patent: Feb. 18, 2020

(54) METHOD FOR PROCESSING VIDEO SIGNAL, AND APPARATUS THEREFOR

(71) Applicant: LG ELECTRONICS INC., Seoul (KR)

(72) Inventors: Eunyong Son, Seoul (KR); Sehoon Yea, Seoul (KR)

(73) Assignee: LG Electronics Inc., Seoul (KR)

( * ) Notice: Subject to any disclaimer, the term of this patent is extended or adjusted under 35 U.S.C. 154(b) by 513 days.

(21) Appl. No.: 15/324,305

(22) PCT Filed: Jul. 6, 2015

(86) PCT No.: PCT/KR2015/006951
§ 371 (c)(1),
(2) Date: Jan. 6, 2017

(87) PCT Pub. No.: WO2016/006894
PCT Pub. Date: Jan. 14, 2016

(65) Prior Publication Data
US 2017/0201747 A1    Jul. 13, 2017

Related U.S. Application Data

(60) Provisional application No. 62/021,195, filed on Jul. 6, 2014.

(51) Int. Cl.
*H04N 19/105* (2014.01)
*H04N 19/117* (2014.01)
(Continued)

(52) U.S. Cl.
CPC ......... *H04N 19/105* (2014.11); *H04N 19/117* (2014.11); *H04N 19/137* (2014.11);
(Continued)

(58) Field of Classification Search
None
See application file for complete search history.

(56) References Cited

U.S. PATENT DOCUMENTS

2010/0278267 A1    11/2010  Lai et al.

FOREIGN PATENT DOCUMENTS

| CN | 101965732 | 2/2011 |
| CN | 102638683 | 8/2012 |

(Continued)

OTHER PUBLICATIONS

International Search Report in International Application No. PCT/KR2015/006951, dated Oct. 29, 2015, 20 pages (with English translation).

(Continued)

*Primary Examiner* — James M Anderson, II
(74) *Attorney, Agent, or Firm* — Fish & Richardson P.C.

(57) ABSTRACT

The present invention relates to a method for decoding a video signal, and an apparatus therefor, the method comprising the steps of: obtaining at least one first reference sample from a first reference picture which is different from a picture containing a current block; generating a first reference sample which is filtered by applying a filter to the obtained first reference sample; generating a reference sample array from the difference between the obtained first reference sample and the filtered first reference sample; obtaining first disparity vector information from the video signal; obtaining a first prediction sample from the generated reference sample array on the basis of the first disparity vector information; and restoring the current block on the basis of the first prediction sample.

20 Claims, 12 Drawing Sheets

(51) Int. Cl.
*H04N 19/44* (2014.01)
*H04N 19/137* (2014.01)
*H04N 19/176* (2014.01)
*H04N 19/18* (2014.01)

(52) U.S. Cl.
CPC .......... *H04N 19/176* (2014.11); *H04N 19/18* (2014.11); *H04N 19/44* (2014.11)

(56) References Cited

FOREIGN PATENT DOCUMENTS

| | | |
|---|---|---|
| CN | 102986234 | 3/2013 |
| CN | 103139562 | 6/2013 |
| CN | 103716629 | 4/2014 |
| KR | 10-2013-0056441 | 5/2013 |
| KR | 10-2014-0072938 | 6/2014 |
| WO | 2013160694 | 10/2013 |

OTHER PUBLICATIONS

Kang et al., "Efficient HD video coding with joint first-order-residual (FOR) and second-order-residual (SOR) coding technique," Journal of Visual Communication and Image Representation, Jan. 2013, 24(3): 1-11, 12 pages.

Chinese Office Action in Chinese Appln. No. 201580036589.3, dated Feb. 25, 2019, 13 pages (with English translation).

mode 0 mode 1 mode 2 mode 3 mode 10 mode 11

Scan mode of the reference block

Reference stripe

Scan mode of the current block

Current stripe

Segment 0　　Segment 1　　Segment 2　　Segment 3

FIG. 9

| 1/16 | 1/8 | 1/16 |
|------|-----|------|
| 1/8  | 1/4 | 1/8  |
| 1/16 | 1/8 | 1/16 |

METHOD FOR PROCESSING VIDEO SIGNAL, AND APPARATUS THEREFOR

CROSS REFERENCE TO RELATED APPLICATIONS

This application is a U.S. National Phase Application under 35 U.S.C. § 371 of International Application PCT/KR2015/006951, filed on Jul. 6, 2015, which claims the benefit of U.S. Provisional Application No. 62/021,195, filed on Jul. 6, 2014, the entire contents of which are hereby incorporated by reference in their entireties.

TECHNICAL FIELD

The present invention relates to video processing, and more specifically, relates to a method and apparatus for processing a video signal using a frequency divisional coding scheme.

BACKGROUND ART

In accordance with the rapid development of a digital video processing technology, a digital multimedia service using various media such as high-definition digital broadcasting, digital multimedia broadcasting, internet broadcasting and the like has been activated. As the high-definition digital broadcasting becomes common, various service applications have been developed and high-speed video processing techniques for video images of high quality and high definition are required. To this end, standards for coding video signals such as H.265/HEVC (High Efficiency Video Coding) and H.264/AVC (Advanced Video Coding) have been actively discussed.

DISCLOSURE OF THE INVENTION

Technical Tasks

An object of the present invention is to provide a method for efficiently processing a video signal and an apparatus therefor.

Another object of the present invention is to provide a method for efficiently processing a video signal using a frequency division scheme and an apparatus therefor.

The other object of the present invention is to provide a method for efficiently processing a video signal in a coding scheme to which inter-frame stripe prediction (ISP) is applied and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

In an aspect of the present invention, provided herein is a method for decoding a video signal by a decoding device, the method comprising: obtaining at least one first reference sample from a first reference picture different from a picture containing a current block; generating a filtered first reference sample by applying a filter to the obtained first reference sample; generating a reference sample array based on a difference between the obtained first reference sample and the filtered first reference sample; obtaining first disparity vector information from the video signal; obtaining a first prediction sample from the generated reference sample array based on the first disparity vector information; and reconstructing the current block based on the first prediction sample.

In another aspect of the present invention, provided herein is a decoding device configured to decode a video signal, the decoding device comprising: a memory configured to store at least one picture; and a processor operatively connected with the memory and configured to: obtain at least one first reference sample from a first reference picture different from a picture containing a current block, generate a filtered first reference sample by applying a filter to the obtained first reference sample, generate a reference sample array based on a difference between the obtained first reference sample and the filtered first reference sample, obtain first disparity vector information from the video signal, obtain a first prediction sample from the generated reference sample array based on the first disparity vector information, and reconstruct the current block based on the first prediction sample.

Preferably, the method further comprises: obtaining inter-frame stripe prediction (ISP) mode information from the video signal, wherein the ISP mode information indicates a scanning order for the current block, and wherein reconstructing the current block includes: reconstructing a one-dimensional sample array for the current block based on the first prediction sample, and converting the reconstructed one-dimensional sample array to a two-dimensional sample array according to the scanning order indicated by the ISP mode information.

Preferably, the method further comprises: obtaining segment number information from the video signal, wherein the segment number information indicates the number of segments contained in a one-dimensional sample array for the current block; if the number of segments is greater than 1, obtaining second disparity vector information from the video signal, and obtaining a second prediction sample from the reference sample array based on the second disparity vector information, wherein the current block is reconstructed based on the first prediction sample and the second prediction sample.

Preferably, obtaining the at least one first reference sample includes: obtaining first motion information from the video signal, obtaining a first motion vector and a first reference picture index from the obtained first motion information, wherein the first reference picture index indicates the first reference picture within a reference picture list, and obtaining the at least one first reference sample from the first reference picture based on the first motion vector.

Preferably, generating the reference sample array includes: converting the difference to a first one-dimensional sample array according to a first scanning order, obtaining a sum of an absolute value of a difference between two adjacent samples within the one-dimensional sample array, converting the difference to a second one-dimensional sample array according to a second scanning order, obtaining a sum of an absolute value of a difference between two adjacent samples within the second one-dimensional sample array, comparing the sum of the absolute value for the first one-dimensional sample array with the sum of the absolute value for the second one-dimensional sample array, and determining a one-dimensional sample array having a smaller sum of the absolute value as the reference sample array according to a result of the comparison.

Preferably, the disparity vector information indicates a disparity vector for a specific segment in the current block, and the disparity vector shows a difference between a start sample position of the specific segment and a start sample position of the first prediction sample in the reference sample array.

Preferably, the method further comprises: obtaining first transform coefficient information from the video signal; and generating first residual data by performing an inverse transform based on the obtained first transform coefficient information, wherein reconstructing the current block includes obtaining a first reconstructed sample of the current block using the first prediction sample and the first residual data.

Preferably, the method further comprises: obtaining at least one second reference sample from a second reference picture; generating a second prediction sample by applying the filter to the obtained second reference sample; obtaining second transform coefficient information from the video signal; generating second residual data by performing an inverse transform based on the obtained second transform coefficient information; and obtaining a second reconstructed sample of the current block based on the second prediction sample and the second residual data.

Preferably, reconstructing the current block includes reconstructing the current block by adding the first reconstructed sample and the second reconstructed sample of the current block.

Preferably, obtaining the at least one second reference sample includes: obtaining second motion information from the video signal, obtaining a second motion vector and a second reference picture index from the obtained second motion information, wherein the second reference picture index indicates the second reference picture within a reference picture list, and obtaining the at least one second reference sample from the second reference picture based on the second motion vector.

Preferably, the first reconstructed sample corresponds to a high frequency component of the current block, and the second reconstructed sample corresponds to a low frequency component of the current block.

Preferably, the filter comprises a Gaussian filter.

Preferably, the filtered first reference sample is generated according to the following equation:

$$L(x, y) = 1/16^*O(x-1, y-1) + 1/8^*O(x, y-1) + 1/16^*O(x+1, y-1) +$$
$$1/8^*O(x-1, y) + 1/4^*O(x, y) + 1/8^*O(x+1, y) +$$
$$1/16^*O(x-1, y+1) + 1/8^*O(x, y+1) + 1/16^*O(x+1, y+1)$$

wherein x indicates a horizontal coordinate of a sample, y indicates a vertical coordinate of a sample, O(x,y) indicates a sample corresponding to (x,y) position among the at least one first reference sample, and L(x,y) indicates a sample corresponding to (x,y) position among the filtered first reference sample.

Preferably, the difference is generated according to the following equation:

$$H(x,y)=O(x,y)-L(x,y)$$

wherein H(x,y) indicates a sample corresponding to (x,y) position among the difference.

Advantageous Effects

According to the present invention, it is able to efficiently process a video signal.

According to the present invention, it is able to efficiently process a video signal using a frequency division scheme.

According to the present invention, it is able to efficiently process a video signal in a coding scheme to which inter-frame stripe prediction (ISP) is applied.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention, illustrate embodiments of the invention and together with the description serve to explain the principle of the invention.

FIG. 9 illustrates a filter capable of being applied to the present invention.

MODE FOR INVENTION

Figure 1:
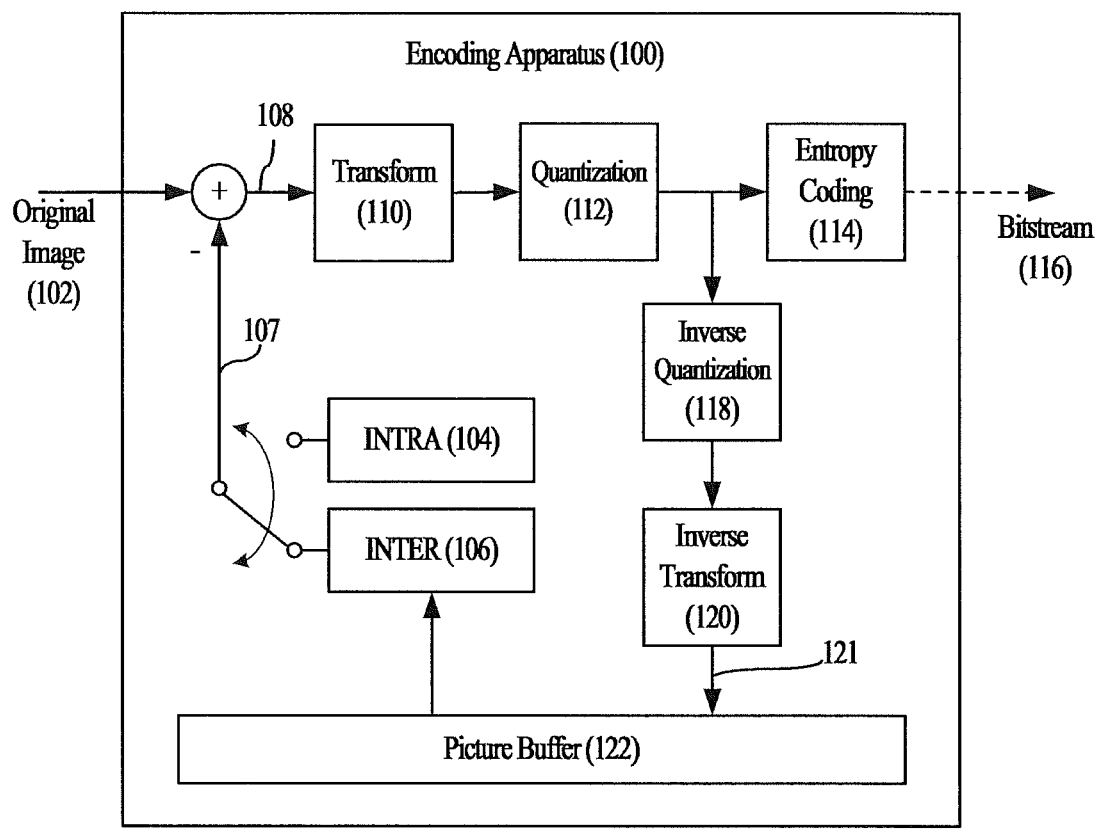
FIG. 1 illustrates an encoding procedure according to the related art.

A technology described in the following can be used for an image signal processing device configured to encode and/or decode a video signal. Generally, a video signal corresponds to an image signal or a sequence of pictures capable of being recognized by eyes. Yet, in the present specification, the video signal can be used for indicating a sequence of bits representing a coded picture or a bit stream corresponding to a bit sequence. A picture may indicate an array of samples and can be referred to as a frame, an image, or the like. More specifically, the picture may indicate a two-dimensional array of samples or a two-dimensional sample array. A sample may indicate a minimum unit for constructing a picture and may be referred to as a pixel, a picture element, a pel, or the like. The sample may include a luminance (luma) component and/or a chrominance (chroma, color difference) component. In the present specification, coding may be used to indicate encoding or may commonly indicate encoding/decoding.

A picture may include at least one or more slices and a slice may include at least one or more blocks. The slice can be configured to include the integer number of blocks for purposes such as parallel processing, resynchronization of decoding when a bit stream is damaged due to data loss, and the like. Each slice can be independently coded. A block may include at least one or more samples and may indicate an array of samples. A block may have a size equal to or a less than a size of a picture. A block may be referred to as a unit. A currently coded picture may be referred to as a current picture and a currently coded block may be referred to as a current block. There may exist various block units constructing a picture. For example, in case of ITU-T H.265 standard (or High Efficiency Video Coding (HEVC) standard), there may exist such a block unit as a coding tree block (CTB) (or a coding tree unit (CTU)), a coding block (CB) (or a coding unit (CU)), a prediction block (PB) (or a prediction unit (PU)), a transform block (TB) (or a transform unit (TU)), and the like.

The coding tree block corresponds to the most basic unit for constructing a picture and can be divided into coding blocks of a quad-tree form to improve coding efficiency according to texture of a picture. The coding block may correspond to a basic unit for performing coding and intra-coding or inter-coding can be performed in a unit of the coding block. The intra-coding is to perform coding using intra prediction and the intra prediction is to perform prediction using samples included in the same picture or slice. The inter-coding is to perform coding using inter prediction and the inter prediction is to perform prediction using samples included in a picture different from a current picture. A block coded using the intra-coding may be referred to as an intra block and a block coded using the inter-coding may be referred to as an inter block. And, a coding mode using the intra-coding can be referred to as an intra mode and a coding mode using the inter-coding can be referred to as an inter mode.

The prediction block may correspond to a basic unit for performing prediction. Identical prediction can be applied to a prediction block. For example, in case of the inter prediction, the same motion vector can be applied to one prediction block. The transform block may correspond to a basic unit for performing transformation. The transformation may correspond to an operation of transforming samples of a pixel domain (or a spatial domain or a time domain) into a conversion coefficient of a frequency domain (or a transform coefficient domain), or vice versa. In particular, an operation of converting a conversion coefficient of the frequency domain (or transform coefficient domain) into samples of the pixel domain (or spatial domain or time domain) can be referred to as inverse transform. For example, the transform may include discrete cosine transform (DCT), discrete sine transform (DST), a Fourier transform, and the like.

FIG. 1 illustrates an encoding procedure according to the related art.

An encoding device 100 receives an input of an original image 102, performs encoding on the original image, and outputs a bit stream 114. The original image 102 may correspond to a picture. Yet, in the present example, assume that the original image 102 corresponds to a block for constructing a picture. For example, the original image 102 may correspond to a coding block. The encoding device 100 can determine whether the original image 102 is coded in intra mode or inter mode. If the original image 102 is included in an intra picture or a slice, the original image 102 can be coded in the intra mode only. However, if the original image 102 is included in an inter picture or a slice, for example, it is able to determine an efficient coding method in consideration of RD (rate-distortion) cost after the intra-coding and the inter-coding are performed on the original image 102.

In case of performing the intra-coding on the original image 102, the encoding device 100 can determine an intra-prediction mode showing RD optimization using reconstructed samples of a current picture including the original image 102 (104). For example, the intra-prediction mode can be determined by one selected from the group consisting of a direct current (DC) prediction mode, a planar prediction mode and an angular prediction mode. The DC prediction mode corresponds to a mode in which prediction is performed using an average value of reference samples among reconstructed samples of a current picture, the planar prediction mode corresponds to a mode in which prediction is performed using bilinear interpolation of reference samples, and the angle prediction mode corresponds to a mode in which prediction is performed using a reference sample located in a specific direction with respect to the original image 102. The encoding device 100 can output a predicted sample or a prediction value (or predictor) 107 using the determined intra prediction mode.

When the inter-coding is performed on the original image 102, the encoding device 100 performs motion estimation (ME) using a reconstructed picture included in a (decoded) picture buffer 122 and may be then able to obtain motion information (106). For example, the motion information can include a motion vector, a reference picture index, and the like. The motion vector may correspond to a two-dimensional vector that provides an offset from a coordinate of the original image 102 to a coordinate in a reference picture in a current picture. The reference picture index may correspond to an index for a list of reference pictures (or a reference picture list) used for inter prediction among the reconstructed pictures stored in the (decoded) picture buffer 122. The reference picture index indicates a corresponding reference picture. The encoding device 100 can output a predicted sample or a predicted value 107 using the obtained motion information.

Subsequently, the encoding device 100 can generate a residual data 108 from a difference between the original image 102 and the predicted sample 107. The encoding device 100 can perform a transform on the generated residual data 108 (110). For example, Discrete Cosine Transform (DCT), Discrete Sine Transform (DST), and/or wavelet transform can be applied for the transform. More specifically, it may use an integer-based DCT having a size of 4×4 to 32×32 and 4×4, 8×8, 16×16, and 32×32 transforms can be used. The encoding device 100 performs transform 110 to obtain transform coefficient information.

The encoding device 100 quantizes the transform coefficient information to generate quantized transform coefficient information (112). Quantization may correspond to an operation of scaling a level of the transform coefficient information using a quantization parameter (QP). Hence, the quantized transform coefficient information may be referred to as scaled transform coefficient information. The quantized transform coefficient information can be output as a bit stream 116 via entropy coding 114. For example, the entropy coding 114 can be performed based on fixed length coding (FLC), variable length coding (VLC), or arithmetic coding. More specifically, it may apply context adaptive binary arithmetic coding (CABAC) based on arithmetic coding, Exp-Golomb coding based on variable length coding, and fixed length coding.

And, the encoding device 100 performs inverse quantization 118 and inverse transform 120 on the quantized transform coefficient information to generate a reconstructed sample 121. Although it is not depicted in FIG. 1, in-loop filtering can be performed on a reconstructed picture after obtaining the reconstructed picture by acquiring the reconstructed sample 121 for a picture. For the in-loop filtering, for example, it may apply a deblocking filter, a sample adaptive offset (SAO) filter. Subsequently, the reconstructed picture 121 is stored in the picture buffer 122 and can be used for encoding a next picture.

Figure 2:
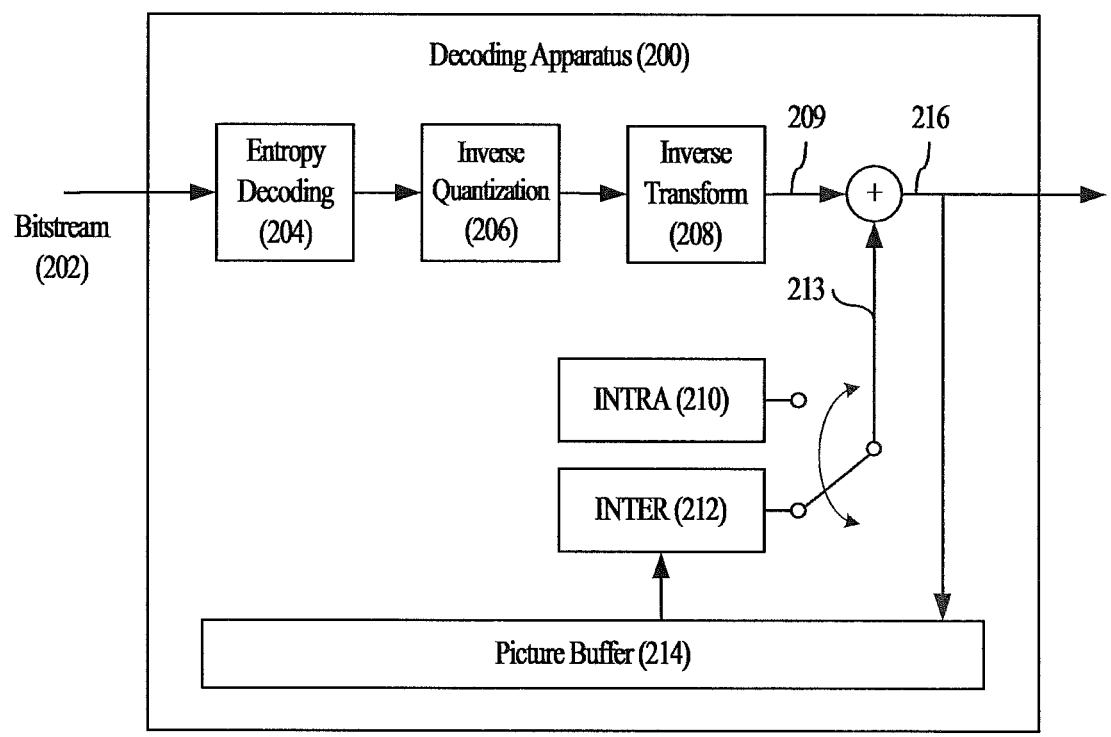
FIG. 2 illustrates a decoding procedure according to the related art.

FIG. 2 illustrates a decoding procedure according to the related art.

A decoding device 200 receives a bit stream 202 and can perform entropy decoding 204. The entropy decoding 204 may correspond to a reverse operation of the entropy coding 114 mentioned earlier in FIG. 1. The decoding device 200 can obtain data and (quantized) transform coefficient information necessary for decoding by including prediction mode information, intra prediction mode information, motion information, and the like through the entropy decoding 204. The decoding device 200 can generate a residual data 209 by performing inverse quantization 206 and inverse transform 208 on the obtained transform coefficient information.

The prediction mode information obtained through the entropy decoding 204 can indicate whether a current block is coded in intra mode or inter mode. If the prediction mode information indicates the intra mode, the decoding device 200 can obtain a prediction sample (or prediction value) 213 from reconstructed samples of a current picture based on the intra prediction mode obtained through the entropy decoding 204 (210). If the prediction mode information indicates the inter mode, the decoding device 200 can obtain a prediction sample (or prediction value) 213 from a reference picture stored in the picture buffer 214 based on the motion information obtained through the entropy decoding 204 (212).

The decoding device 200 can obtain a reconstructed sample 216 for the current block using the residual data 209 and the prediction sample (or prediction value). Although it is not depicted in FIG. 2, in-loop filtering can be performed on a reconstructed picture after the picture is reconstructed by obtaining the reconstructed sample 216 for a picture. Subsequently, the reconstructed picture 216 can be stored in the picture buffer to decode a next picture or can be outputted for display.

Figure 3:
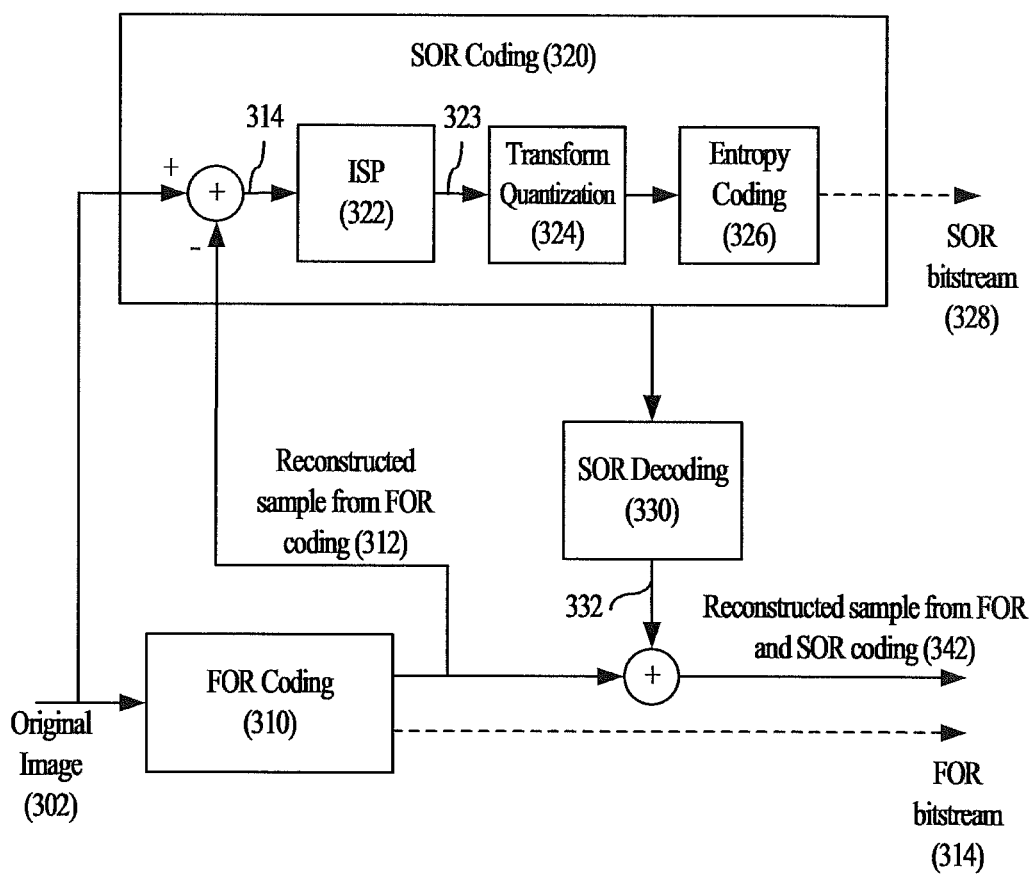
FIG. 3 illustrates an encoding method using Inter-frame Stripe Prediction (ISP).

FIG. 3 illustrates an encoding method using Inter-frame Stripe Prediction (ISP). The encoding method using ISP is divided into FOR (First Order Residual) coding and SOR (Second Order Residual) coding, and sequentially performs the FOR coding and the SOR coding. An original image 302 may correspond to one picture. Yet, in the present example, assume that the original image 302 corresponds to a block constructing a picture. The original image 302 can include at least one or more pixels. The original image 302 may correspond to a coding block as a non-limited example, and may include at least one or more prediction blocks. In the following description, the original image 302 can be referred to as an input block.

Referring to FIG. 3, the input block 302 can be inputted to a FOR coding unit 310 and a SOR coding unit 320. For example, the FOR coding unit 310 can encode the input block 302 according to the encoding method mentioned earlier with reference to FIG. 1 to generate a bit stream 314 and a reconstructed sample 312. For example, the bit stream 314 may correspond to the bit stream 116 mentioned earlier in FIG. 1 and the reconstructed sample 312 may correspond to the reconstructed sample 121 mentioned earlier in FIG. 1. In the present specification, the bit stream 314 generated by the FOR coding unit 310 is referred to as a FOR bit stream. The FOR bit stream 314 can be transmitted via a network or stored in a storage device. The reconstructed sample 312 generated from the FOR coding unit 310 is inputted to the SOR coding unit 320 and can be used for the SOR coding 320.

In the FOR coding unit 310, a quantization parameter (QP) having a high value is applied (e.g., refer to the description related to 112 of FIG. 1). The quantization parameter may correspond to a variable for scaling a size level (or a transform coefficient level) of the transform coefficient information obtained through the transform. For example, a quantization parameter having a value of about 30 to 40 can be used in the FOR coding unit 310. In this case, if a quantization parameter having a high value is applied, transform coefficient information existing in the high frequency region among the transform coefficient information can be mostly scaled into a value of 0. In this case, a difference between the input block 302 and the reconstructed sample 312 from the FOR coding unit 310 shows a stripe pattern at the boundary of objects belonging to the original image.

The SOR coding unit 320 receives the input block 302 and the reconstructed samples 312 generated from the FOR coding unit 310 and obtains a residual data 314 from a difference between the two signals. Since the FOR coding unit 310 uses a quantization parameter of a high value, the residual data 314 may have a stripe pattern corresponding to the boundary between objects belonging to the original image. The obtained residual data 314 is inputted to the ISP 322 and the ISP 322 performs a prediction on the residual data 314 to obtain a prediction value (or a prediction sample) for the residual data 314. The ISP 322 outputs a residual data 323 based on a difference between the residual data 314 and the obtained prediction value. Regarding the operation of the ISP 322, it shall be described in detail with reference to FIGS. 4 to 7.

The SOR coding unit 320 performs transformation on the residual data 323 outputted from the ISP 322 to obtain transform coefficient information and quantizes the obtained transform coefficient information to obtain quantized transform coefficient information. And, the SOR coding unit 320 performs entropy coding on various information for SOR coding and the quantized transform coefficient information according to a predetermined format to generate a bit stream 328. In the present specification, the bit stream 328 generated by the SOR coding unit 320 is referred to as a SOR bit stream.

The quantized transform coefficient information generated by the SOR coding unit 320 is inputted to the SOR decoding unit 330. The SOR decoding unit 330 performs inverse quantization and inverse transform on the quantized transform coefficient information and performs inter-frame stripe prediction on the inversely transformed residual data using the motion information (e.g., disparity vector) obtained at the ISP 322. The SOR decoding unit 330 adds the prediction sample obtained through the inter-frame stripe prediction to the inversely transformed residual data to obtain a reconstructed sample 332 reconstructed by the SOR coding unit 320.

The reconstructed sample 312 according to the FOR coding 310 and the reconstructed sample 332 according to the SOR coding 320 are summed to generate a reconstructed sample 342 according to the encoding method of FIG. 3. The reconstructed sample 342 is stored in the picture buffer and can be used for performing the FOR coding 310 on a next picture. And, since the reconstructed samples 332 according to the SOR coding 310 are required for performing the SOR coding 320 on a next picture, the reconstructed samples 332 can also be stored in the picture buffer. Or, the reconstructed sample 312 according to the FOR coding and the reconstructed sample 332 according to the SOR coding can be stored in the picture buffer.

Figure 4:
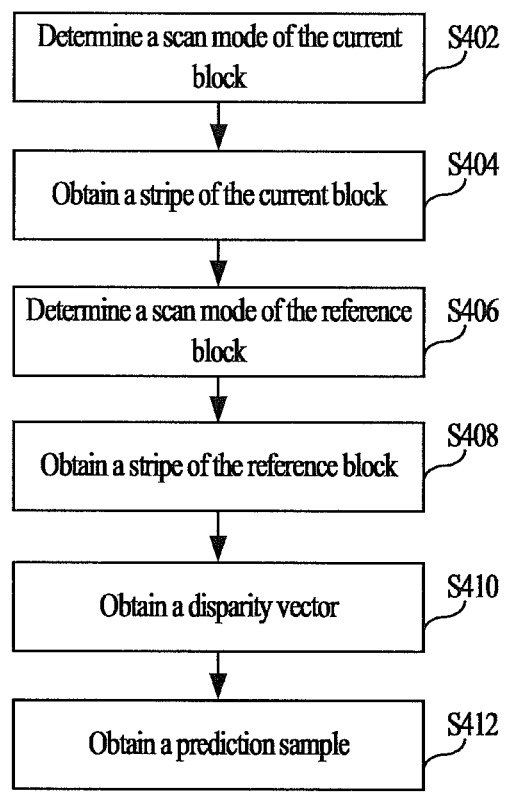
FIG. 4 illustrates a flowchart for inter-frame stripe prediction (ISP).

FIG. 4 illustrates a flowchart for inter-frame stripe prediction (ISP). An order shown in FIG. 4 is just an example only. The order may be changed.

In the step S402, a scan mode of a current block is determined. The scan mode indicates a scanning order for a corresponding block. More specifically, the scan mode may indicate a scanning order to switch samples of a block into a one-dimensional array (or stripe) or to switch a one-dimensional sample array (or stripe) into a block. In the present specification, the scan mode can be referred to as a stripe scanning mode or an ISP mode. For example, when a size of a current block corresponds to 8×8, the scan mode may indicate one of 12 scanning orders.

In the step S402, the current block may correspond to a residual data 314 obtained from a difference between the input block (e.g., 302) and the reconstructed signal (e.g., 312) which is generated by the FOR coding (e.g., 310) performed on the input block. A specific metric is set to determine a scan mode and each scan mode is applied to the set metric. As a result, a scanning order having the best value can be determined as the scan mode. For example, when a current block is represented by a one-dimensional sample array according to a specific scanning order, the smoothness of the one-dimensional sample array can be used as a metric. The smoothness can be represented by the sum of differences between adjacent samples. For example, if a difference between adjacent samples included in the one-dimensional sample array is small, since a change of a sample value is small, the smoothness is high. If the difference between the adjacent samples included in the one-dimensional sample array is big, since the change of the sample value is big, the smoothness is low.

As a more concrete example, the sum of absolute values of the differences between adjacent samples included in the one-dimensional sample array can be used as a metric to measure smoothness. In this case, an absolute value of the difference between adjacent samples included in the one-dimensional sample array can be obtained among the available scanning modes. A scanning order of which the sum of the absolute values becomes a minimum can be determined as the scan mode. For example, when a current block corresponds to 8×8, an absolute value for a difference between adjacent samples is obtained for all 12 scanning orders and a scanning order showing a minimum value can be determined as a scan mode of the current block. The sum of the absolute values of the differences between adjacent samples included in the one-dimensional array can be represented by Equation 1.

$$m = \underset{s \in mod}{\operatorname{argmin}} \left\{ \sum_{p=0}^{maxPix-1} |D(s, p)| \right\}$$ [Equation 1]

$$D(s, p) = Vs(p + 1) - Vs(p)$$

In Equation 1, maxPix corresponds to the number of pixels included in a corresponding block, p corresponds to a scanning order of pixels for the block or a position or an index of samples in a one-dimensional sample array, s corresponds to a number or an index corresponding to a scan mode, mod corresponds to a set of available scan modes, ‖ indicates an absolute value, argmin corresponds to a function that selects a smallest result value in the { } among the s belonging to the mod, and m corresponds to a determined scan mode. In Equation 1, Vs(p) indicates a sample corresponding to a position of p in the one-dimensional sample array arranged according to a scan mode s and D(s, p) indicates a difference between a sample corresponding to a position of p+1 and a sample corresponding to a position of p in the one-dimensional sample array arranged according to the scan mode s. The P may have values ranging from 0 to (the maximum pixel number of a block−1).

In the step S404, it is able to obtain the one-dimensional sample array by scanning the pixels of the current block according to the scan mode determined in the step S402. For clarity, a one-dimensional sample array generated by scanning samples of a block according to a specific scan mode (or a scanning order) can be referred to as a stripe and a sample array (or stripe) obtained from the current block can be referred to as a current stripe. A stripe includes samples as many as samples identical to the number of pixels included in a corresponding block and each sample has an index corresponding to a scanning order in the stripe. For example, when scanning is performed on a specific block, an index 0 is assigned to a pixel corresponding to a start point and an index of (the number of pixels of the block−1) can be assigned to a lastly scanned pixel. As a more concrete example, pixels included in a stripe for an 8×8 block may have indexes ranging from 0 to 63 and pixels included in a stripe for a 4×4 block may have indexes ranging from 0 to 15.

A stripe can be divided into at least one or more segments. In the present specification, a segment may correspond to a group of samples that includes all or a part of samples included in a stripe. Segments constructing a stripe may include the same number of samples, by which the present invention may be non-limited. Each segment can be configured to include a different number of samples. And, one segment can be configured to include contiguous samples in a stripe including the segment, by which the present invention may be non-limited. One segment can be configured to include samples having discontinuous indexes in a stripe. In this case, the samples included in the segment can be configured to have a specific offset.

Figure 6A:
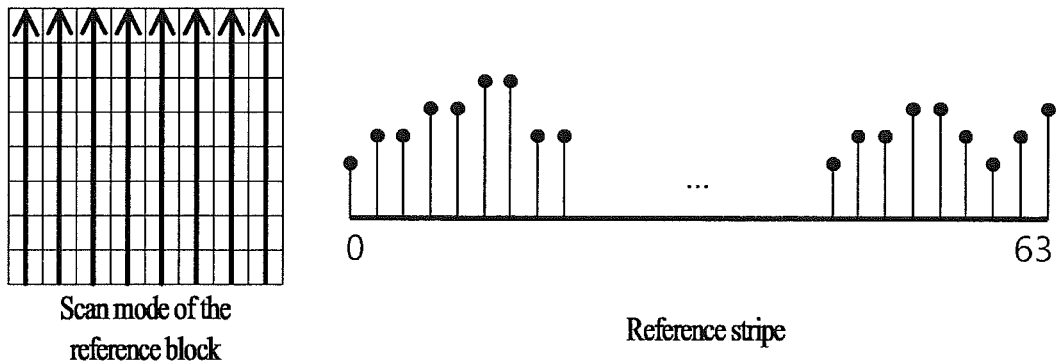
FIGS. 6A to 6C illustrate stripes and segments generated according to a specific scan mode.
Figure 6B:
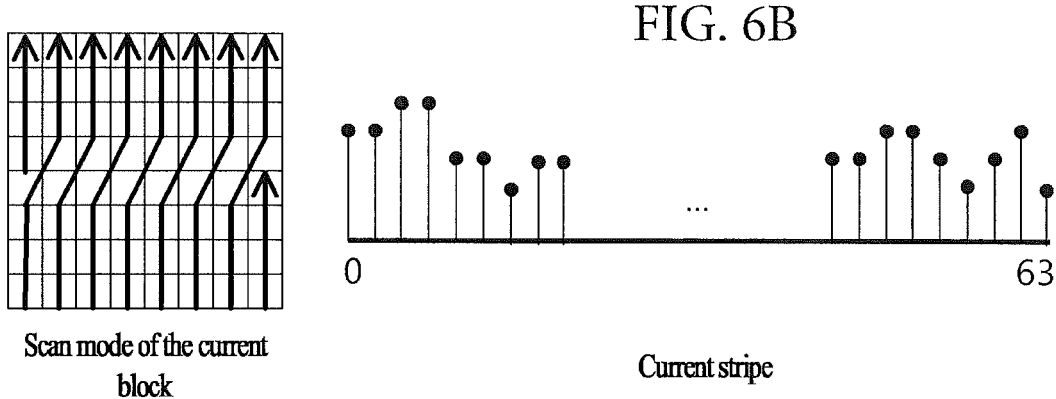
Figure 6C:
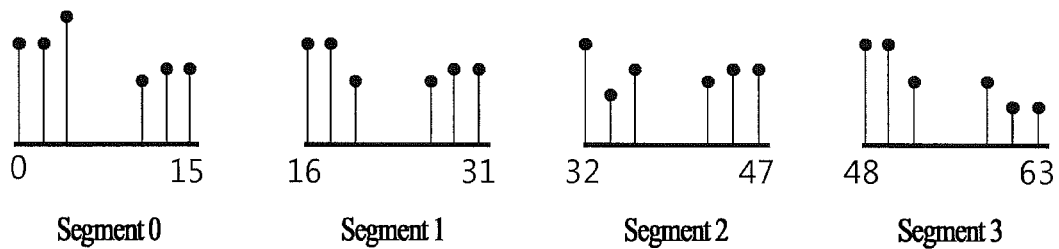

For example, if a stripe corresponding to an 8×8 block is divided into four segments, samples having indexes 0 to 15 in the stripe can be included in the first segment, samples having indexes 16 to 31 can be included in the second segment, samples having indexes 32 to 47 can be included in the third segment, and samples having indexes 48 to 63 can be included in the fourth segment (e.g., refer to FIG. 6C).

In the step S406, a scan mode of a reference block is determined. The reference block includes at least one or more reference samples and can be obtained from a reference picture different from a current picture or can be obtained from a reconstructed sample of the current picture. The reference block can be obtained based on motion information (e.g., a reference picture index, a motion vector) or can be obtained from a predefined location. If the reference block is obtained based on the motion information, the motion information can be obtained by performing motion estimation on a reconstructed sample (e.g., 332 of FIG. 3) of a previous picture for SOR coding. Or, the motion information can be obtained based on the motion information determined by FOR coding (e.g., 310). If the reference block is obtained based on the predefined location, for example, the reference block can be obtained from a co-located block of a location corresponding to the current block within a previously encoded reference picture. In the step S406, the reference block can be obtained from a reconstructed sample (e.g., 332 of FIG. 3) generated from SOR coding.

In order to determine a scan mode of a reference block, it may be able to identically or similarly apply the method, which was used to determine a scan mode of a current block. For example, when a reference block is represented by a one-dimensional sample array according to a specific scanning order, smoothness of the one-dimensional sample array can be used as a metric. As a more concrete example, an absolute value for a difference between adjacent samples included in the one-dimensional sample array is obtained and a scanning order of which the sum of the absolute values becomes a minimum value can be determined as the scan mode.

In the step S408, a stripe of the reference block is obtained according to the scan mode determined in the step S406. For clarity, a sample array (or stripe) or a reference sample array obtained from the reference block can be referred to as a reference stripe.

In the step S410, a disparity vector for the stripe of the current block is obtained. In order to obtain the disparity vector, the stripe of the current block is divided into at least one or more segments and a disparity vector can be obtained from each of the divided segments. For example, when the stripe of the current block is divided into the specific number of segments, it may be able to obtain disparity vectors as many as the specific number of the segments with respect to the current stripe. The number of segments included in the stripe of the current block can be defined in advance on the encoder and decoder side. Or, the number of segments for RD optimization can be determined by the encoder side and then the number of segments can be informed to the decoder side through a bit stream.

In order to obtain a disparity vector for a specific segment of a stripe of a current block, Sum of Absolute Differences (SAD) is obtained between the samples included in the specific segment and reference samples from the stripe of the reference block and it may be able to determine reference samples of which the SAD becomes a minimum. It is able to determine a disparity vector based on a difference between locations of the determined reference samples and a location of the specific segment. For example, the disparity vector may indicate a difference or a displacement between a start sample location of the segment and a start sample location of the samples of which the SAD becomes a minimum value.

In the step S412, it is able to obtain a prediction sample for each segment. In the encoding process, the prediction sample can be obtained from the reference samples with the minimum SAD in step S410. In the decoding process, the prediction sample can be obtained from the stripe of the reference block using the disparity vector. Residual data for each segment can be obtained using the obtained prediction samples and the residual data can be included in a bit stream (e.g., 328 of FIG. 3) in a manner of being underwent transform and quantization (e.g., 324 of FIG. 3) and entropy coding (e.g., 326 of FIG. 3). The disparity vector obtained in the step S410 can be included in a bit stream (e.g., 328 of FIG. 3) in a manner of being underwent the entropy coding (e.g., 326 of FIG. 3). Or, it may be able to obtain residual data for the current block by concatenating the residual data for each segment. It may be able to perform transformation, quantization, and entropy coding on the residual data for the current block.

FIGS. 5A to 5F illustrate examples of a scan mode capable of being used for inter-frame stripe prediction (ISP). In the examples of FIGS. 5A to 5F, a small square indicates a pixel and a thick solid line indicates a scanning order. Although the examples of FIGS. 5A to 5F illustrate examples of a scan mode for an 8×8 block, scan modes similar to the scan mode shown in FIGS. 5A to 5F can be used although a current block has a size other than 8×8. There may exist 12 scan modes when the current block corresponds to 8×8, there may exist 6 scan modes when the current block corresponds to 4×4, there may exist 18 scan modes when the current block corresponds to 16×16, and there may exist 24 scan modes when the current block corresponds to 32×32. FIGS. 5A to 5F illustrate a scan mode 0, a scan mode 1, a scan mode 2, a scan mode 3, a scan mode 10, and a scan mode 11, respectively. The remaining scan modes 4 to 9 can also be determined in a manner of being similar to that illustrated in FIGS. 5A to 5F.

Figure 5A:
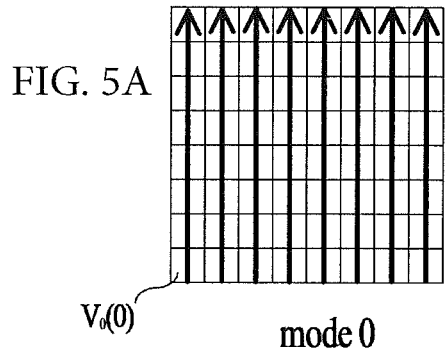
FIGS. 5A to 5F illustrate scan modes capable of being used for inter-frame stripe prediction (ISP).

Referring to FIG. 5A, scanning is sequentially performed from $V_0$ (0) of the current block to the uppermost pixel in the vertical direction and then the scanning is sequentially performed from a right pixel of the $V_0$ (0) to the uppermost pixel in the vertical direction. By doing so, it may be able to generate a one-dimensional sample array by scanning to the rightmost column.

Figure 5B:
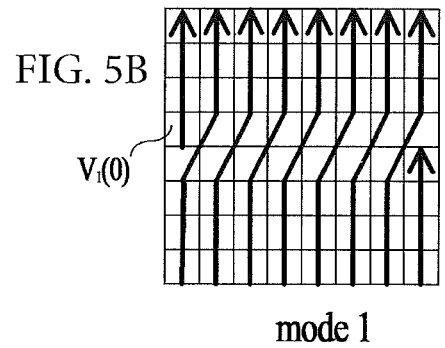

Referring to FIG. 5B, scanning is sequentially performed in the vertical direction starting from $V_1$ (0) of the current block to the uppermost pixel. Subsequently, scanning is performed from the lowermost pixel of a column including the $V_1$ (0) to the pixel immediately below the $V_1$ (0). Subsequently, scanning is sequentially performed from the right pixel of the $V_1$ (0) to the upper pixel in the vertical direction. The remaining pixels passing through a bold solid line can be sequentially scanned in an arrow direction in the same manner to generate the one-dimensional sample array.

Figure 5C:
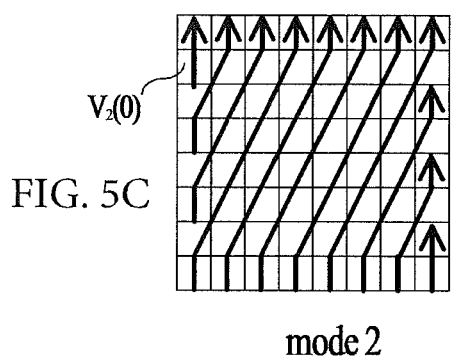

Referring to FIG. 5C, scanning is sequentially performed in the vertical direction starting from $V_2$ (0) of the current block to the uppermost pixel. Subsequently, scanning is performed on a second lower pixel of the $V_2$ (0) in a column including the $V_2$ (0), a pixel above the second lower pixel of the $V_2$, the right pixel of the $V_2$ (0), and then a pixel right above the right pixel of the $V_2$ (0). The remaining pixels passing through a bold solid line can be sequentially scanned in an arrow direction in the same manner to generate the one-dimensional sample array.

Figure 5D:
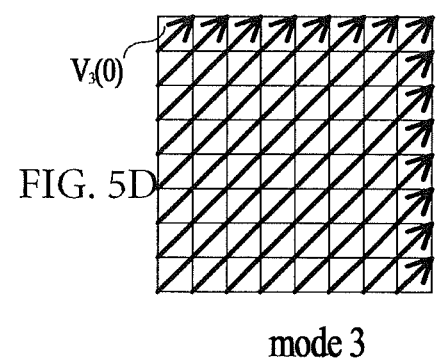

Referring to FIG. 5D scanning is sequentially performed in the diagonally upper right direction starting from $V_3$ (0) of the current block. A one-dimensional sample array can be generated by sequentially scanning pixels passing through a bold solid line in an order of an arrow of a bold solid line located at the upper left and an arrow of a bold solid line located at the lower right.

Figure 5E:
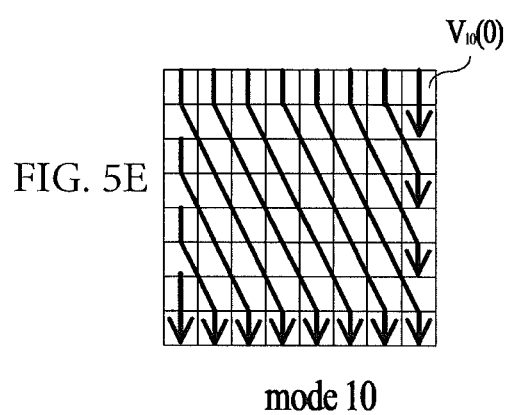

Referring to FIG. 5E, scanning is performed downward in the vertical direction starting from $V_{10}$ (0) of the current block. Subsequently, pixels are sequentially scanned in an order that a bold solid line passes along an arrow starting from the left pixel of the $V_{10}$ (0). The remaining pixels passing through a bold solid line can be sequentially scanned in an arrow direction in the same manner to generate the one-dimensional sample array.

Figure 5F:
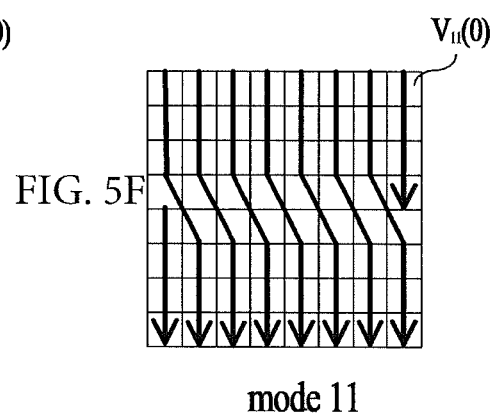

Referring to FIG. 5F, scanning is performed downward in the vertical direction starting from $V_{11}$ (0) of the current block. Subsequently, pixels are sequentially scanned in an order that a bold solid line passes along an arrow starting from the left pixel of the $V_{11}$ (0). The remaining pixels passing through a bold solid line can be sequentially scanned in an arrow direction in the same manner to generate the one-dimensional sample array.

FIGS. 6A to 6C illustrate stripes and segments generated according to a specific scan mode. In the examples of FIGS. 6A to 6C, although it is assumed that a stripe for an 8×8 block is generated, an identical/similar principle can be applied to blocks of a different size. And, in FIGS. 6A to 6C, it is assumed that a scan mode of a reference block is determined by a scan mode 0 and a scan mode of a current block is determined by a scan mode 1. However, although the scan mode of the reference block and the scan mode of the current block are determined by a different scan mode rather than the scan mode 0 or the scan mode 1, it may generate an identical/similar stripe. For example, the example of FIG. 6A relates to the steps S406 and S408 of FIG. 4 and the example of FIG. 6B relates to the steps S402 and S404 of FIG. 4.

Referring to FIG. 6A, as shown on the right side of FIG. 6A, reference stripes can be generated by scanning pixels of the reference block in an order according to the scan mode of the reference block. For example, as mentioned earlier with reference to the step S402 of FIG. 4, the scan mode of the reference block can be determined on the basis of the smoothness of the one-dimensional array and a reference stripe can be generated according to the scan mode of the reference block. Since the 8×8 block is assumed in the examples of FIGS. 6A and 6B, it may assume that there are 12 available scan modes. Hence, the block is converted into a one-dimensional sample array for each of the 12 scan modes, a result value is obtained according to Equation 1 in the following, and a scan mode showing the smallest value among the 12 result values can be determined as the scan mode of the reference block. As a result of the aforementioned calculation, the scan mode 0 is determined as the scan mode of the reference block in the example of FIG. 6A and the scan mode 1 can be determined as the scan mode of the current block in the example of FIG. 6B.

Referring to FIG. 6C, the current stripe shown in FIG. 6B can be divided into four segments. For example, pixels corresponding to indexes 0 to 15 are assigned to a segment 0, pixels corresponding to indexes 16 to 31 are assigned to a segment 1, pixels corresponding to indexes 32 to 47 are assigned to a segment 2, pixels corresponding to indexes 48 to 63 can be assigned to the a segment 3. Subsequently, it may be able to obtain a disparity vector for each of the divided segments.

Figure 7:
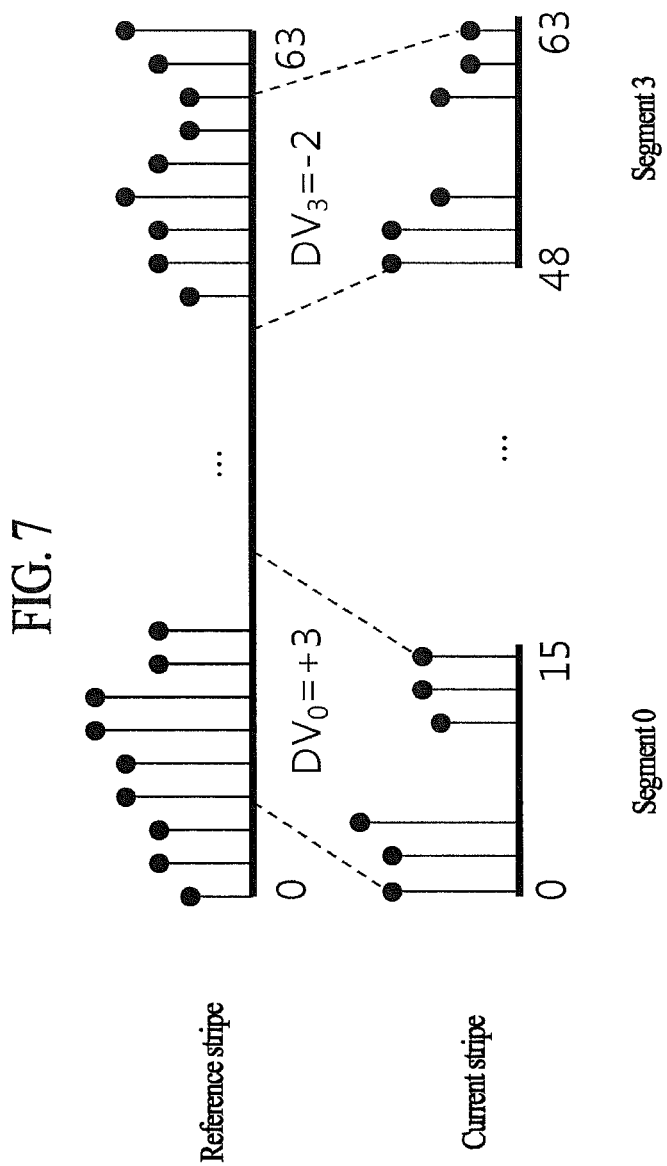
FIG. 7 illustrates a disparity vector for a segment.

FIG. 7 illustrates a disparity vector for a segment. In order to obtain a disparity vector for a specific segment, reference samples having a length identical to a length of the specific segment are compared with each other in a reference stripe to find out reference samples of which SAD (Sum of Absolute Difference) becomes a minimum. For example, it may obtain a SAD value between the reference samples having the length identical to the length of the specific segment and the specific segment starting from a sample corresponding to an index 0 in the reference stripe and sequentially obtains the SAD values while moving a pixel section one by one in the right direction to find out the reference samples showing the minimum SAD value. In the example of FIG. 7, since it is assumed that a block size corresponds to 8×8 and the current stripe is divided into four segments, it is able to obtain 0 to 15 samples of the reference stripe 0 and SAD and 1 to 16 samples of the reference stripe 1 and SAD with respect to the segment 0. It is able to obtain 48 to 63 samples of a reference stripe and SAD by sequentially repeating the aforementioned process. Accordingly, in the example of FIG. 7, 49 SAD values can be obtained by performing SAD calculation 49 times on the segment 0 and it may be able to determine reference samples showing the smallest value among the 49 SAD values.

A disparity vector can be represented by a difference or displacement between a start position of reference samples that minimizes SAD within a reference stripe and a start position of a corresponding segment. In the example of FIG. 7, the reference samples of the reference stripe showing the smallest SAD value for the segment 0 can be determined by samples 3 to 18. In this case, a disparity vector for the segment 0 can be represented by 3 (e.g., $DV_0=+3$). Similarly, in the example of FIG. 7, reference samples of a reference stripe showing the smallest SAD value can be determined by samples 46 to 61 by repeatedly performing a process identical/similar to the aforementioned process on a segment 3. In this case, a disparity vector for the segment 3 can be represented by −2 (e.g., $DV_0=-2$). For example, the operation mentioned earlier with reference to FIG. 7 can be performed in the step S410 of FIG. 4.

A disparity vector and a scan mode of a current block can be stored in a bit stream (e.g., SOR bit stream 328) via entropy coding. Since it is able to obtain a scan mode of a reference block by a decoder using a scheme identical to the scheme used by an encoder, the scan mode of the reference block may not be stored in the bit stream. On the other hand, since the decoder does not have any information on the current block, the decoder is unable to know the scan mode used by the encoder. Hence, the scan mode of the current block can be included in the bit stream via entropy coding. In addition, information indicating whether or not there is non-zero quantized transform coefficient information for each segment can be included. For clarity, the information indicating whether or not there is non-zero quantized transform coefficient information can be referred to as CBF (Coded Block Flag). If there is non-zero transform coefficient information for a corresponding segment, a CBF having a value of 1 can be stored in the bit stream. If there is no non-zero transform coefficient information for a corresponding segment, a CBF having a value of 0 can be stored in the bit stream.

In addition, the segment division scheme can be identically defined in advance on the encoder side and the decoder side. In this case, information on the segment division scheme may not be included in the bit stream (e.g., SOR bit stream 328). However, in case of supporting a variable segment division scheme, information on the segment division scheme can be included in the bit stream as well. For example, the information on the segment division scheme may include at least one of information on the number of segments in which a current stripe is divided, information on the number of samples included in each segment, and the like.

In case of the encoding method shown in FIG. 3, since the SOR coding 320 is performed using the reconstructed sample 312 generated through the FOR coding 310, two encoding processes should be sequentially performed. Therefore, a processing delay occurs compared to a legacy encoding method (e.g., see FIG. 1) that performs an encoding process corresponding to FOR coding only. In addition, due to the sequentially performed encoding process, it is difficult to implement parallel processing.

And, in case of the encoding method mentioned earlier in FIG. 3, since two layers including the FOR coding 310 and the SOR coding 320 are configured, two bit streams (e.g., SOR bit stream 328 and FOR bit stream 322) can be generated from the FOR coding and the SOR coding. Hence, it is necessary to have two bit streams to encode/decode a video. In this case, since a video sequence is coded by two bit streams, syntax included in each of the bit streams can be overlapped with each other, thereby deteriorating coding efficiency.

And, in case of the encoding method mentioned earlier in FIG. 3, it may be necessary to store reconstructed samples (e.g., 332 and 342 or 312 and 332) of two types in a picture buffer (or a decoded picture buffer) to perform coding on a next picture. As a result, a storage space for storing the reconstructed samples increases compared to the legacy method (e.g., refer to FIG. 1). Hence, there is a problem that a big storage space is required.

Hence, the present invention proposes a method for improving the problem of the encoding method mentioned earlier in FIG. 3. In the encoding method according to the present invention, an original image and a reconstructed image are filtered and divided into a low-frequency image and a high-frequency image, an encoding method according to a legacy method (e.g., refer to FIG. 1) is applied to the low-frequency image and ISP is applied to the high-frequency image to perform encoding. For example, a filter applied to the original image and the reconstructed image corresponds to a low pass filter and generates a low frequency component of an input image as an output. A coefficient and a size (or a kernel size) of the filter can be differently applied depending on a type and a size of an image inputted to the filter. The encoding/decoding method according to the present invention can be referred to as a frequency division coding scheme.

Figure 8:
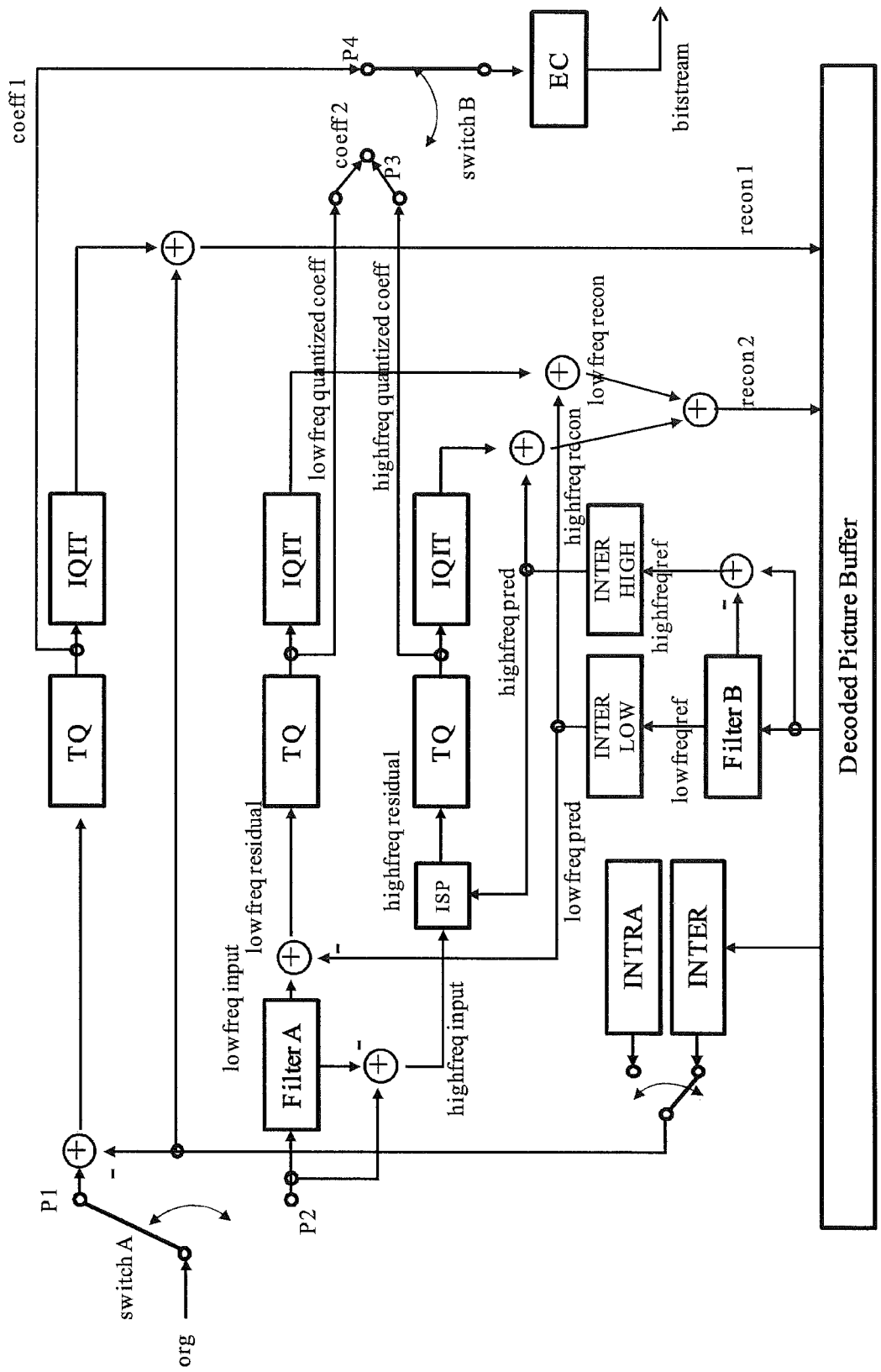
FIG. 8 illustrates an encoding method according to the present invention.

FIG. 8 illustrates an encoding method according to the present invention. In the example of FIG. 8, a coding method using an inter prediction mode is mainly explained. However, the encoding/decoding method according to the present invention can also be identically/similarly applied to a coding method using an intra prediction mode.

According to the encoding method illustrated in FIG. 8, it may be able to selectively use the legacy encoding method (e.g., refer to FIG. 1) and the encoding method according to the present invention. For example, it may be able to select an encoding method showing a better result from among the legacy encoding method and the encoding method according to the present invention by calculating RD (rate-distortion) cost.

Referring to FIG. 8, it is able to use a switch A and a switch B to select a data path for the legacy encoding method (e.g., refer to FIG. 1) and a data path for the encoding method according to the present invention, respectively. If the legacy encoding method is selected by calculating the RD cost, the switch A can be switched to P1 and the switch B can be switched to P4. If the legacy encoding method is selected, a current block (org) is inputted to a summer through the P1 in a current picture. And, motion estimation (ME) is performed (INTER block) using reference pictures stored in a picture buffer (decoded picture buffer) to obtain motion information and reference samples and the obtained motion information and the reference samples can be inputted to the summer according to a path of a switch set to INTER. Residual data between the current block (org) and the reference sample of the reference picture is obtained in the summer and transform and quantization (TQ) are performed on the residual data obtained according to the legacy encoding method to generate transform coefficient information (coeff1). Entropy coding (EC) is performed on the generated transform coefficient information (coeff1) via the P4 to store the generated transform coefficient information in a bit stream. The generated transform coefficient information (coeff1) is reconstructed through inverse transformation and inverse quantization (IQIT) and reconstructed samples (recon1) of the current block are stored in the picture buffer.

If the encoding method according to the present invention is selected by calculating the RD cost, the switch A can be switched to P2 and the switch B can be switched to P3. In this case, the current block (org) of the current picture is inputted to a filter (filter A) through the P2. The filter A may correspond to a low pass filter and may be able to filter the inputted current block to generate an input sample (lowfreq input) for a low frequency component of the current block. Subsequently, the input sample (lowfreq input) outputted through the filter A is inputted to the summer and the summer can generate an input sample (highfreq input) corresponding to a high frequency component of the current block based on a difference between the sample of the current block (org) and the input sample (lowfreq input) for the low frequency component of the current block.

It may be able to perform motion estimation (ME) to perform coding in an inter prediction mode. In order to perform the motion prediction, it may filter the reference samples of the reference picture stored in the picture buffer (decoded picture buffer). The reference sample stored in the picture buffer is inputted to a filter (filter B) and the filter (Filter B) filters the inputted reference sample to generate a reference sample (lowfreq ref) corresponding to a low frequency component. The generated reference sample (low frequency ref) of the low frequency component is inputted to a motion estimation unit (INTER LOW) for a low frequency component. In the motion estimation unit (INTER LOW) for a low frequency component, the motion estimation is performed using the input sample (lowfreq input) corresponding to the low frequency component of the current block and the reference sample (lowfreq ref) of the low frequency component. As a result of performing the motion estimation, it is able to obtain motion information (e.g., a motion vector, a reference picture index, etc.) and a prediction sample (lowfreq pred) of a low frequency component.

The input sample (lowfreq input) corresponding to the low frequency component of the current block and the prediction sample (lowfreq pred) of the low frequency component are inputted to the summer to generate residual data (lowfreq residual) corresponding to a low frequency component. It may be able to generate transform coefficient information (lowfreq quantized coeff) of a low frequency component by performing transformation and quantization (TQ) on the residual data (lowfreq residual) corresponding to the low frequency component. The generated transform coefficient information (lowfreq quantized coeff) of the low frequency component is added to the prediction sample of the low frequency component again via inverse quantization and inverse transform (IQIT) to generate a reconstructed sample (lowfreq recon) of a low frequency component.

And, the reference sample (lowfreq ref) corresponding to the low frequency component is inputted to the summer together with the reference sample of the reference picture. The summer generates a reference sample (highfreq ref) corresponding to a high frequency component based on a difference between the reference sample (lowfreq ref) corresponding to the low frequency component and the reference sample of the reference picture. The generated reference sample (highfreq ref) of the high frequency component is inputted to a motion estimation unit (INTER HIGH) for high frequency component and the motion estimation unit (INTER HIGH) for high frequency component performs motion estimation using an input sample (highfreq input) corresponding to a high frequency component of the current block and the reference sample (highfreq ref) of the high frequency component. As a result of performing the motion estimation, it is able to obtain motion information (e.g., a motion vector, a reference picture index, etc.) and a prediction sample (highfreq pred) of a high frequency component.

Or, if motion estimation for a low frequency component and motion estimation for a high frequency component are individually performed, since it may take more processing time and it is necessary to individually transmit motion information, information to be transmitted through a bit stream may increase. In order to prevent this, it is able to obtain a prediction sample (highfreq pred) of a high frequency component from a reference sample (highfreq ref) of a high frequency component by using motion information on the low frequency component without performing motion estimation on the high frequency component. Or, it is also able to obtain a prediction sample (lowfreq pred) of a low frequency component using the motion information on the high frequency component by performing motion estimation on the high frequency component only.

The input sample (highfreq input) corresponding to the high frequency component of the current block and the prediction sample (highfreq pred) of the high frequency component are inputted to an inter-frame stripe prediction unit (ISP). The inter-frame stripe prediction unit (ISP) can perform the operations mentioned earlier with reference to FIGS. 4 to 7. In this case, for example, the input sample (highfreq input) corresponding to the high frequency component of the current block may correspond to the current block shown in FIG. 4 and the prediction sample (highfreq pred) of the high frequency component may correspond to the reference block shown in FIG. 4.

The inter-frame stripe prediction unit (ISP) performs inter-frame stripe prediction to generate disparity vectors of segments for residual data (highfreq residual) of high frequency component and an input sample (highfreq input) corresponding to the high frequency component of the current block. It is able to generate transform coefficient information (highfreq quantized coeff) of the high frequency component by performing transformation and quantization (TQ) on the residual data (highfreq residual) of the high frequency component. The generated transform coefficient information (highfreq quantized coeff) of the high frequency component is added to the predicted sample (highfreq pred) of the high frequency component again via the inverse quantization and inverse transform (IQIT) to generate a reconstructed sample (highfreq recon) of high frequency component.

The reconstructed sample (lowfreq recon) of the low frequency component and the reconstructed sample (highfreq recon) of the high frequency component can be added up together to generate a reconstructed sample (recon2). The generated reconstructed sample (recon2) can be stored in the picture buffer (decoded picture buffer) to encode a next picture.

In addition, the transform coefficient information (lowfreq quantized coeff) of the low frequency component and the transform coefficient information (highfreq quantized coeff) of the high frequency component can be aggregated with each other at the P3 to form single transform coefficient information (coeff2). Entropy coding is performed on the aggregated transform coefficient information (coeff2) to generate a bit stream.

As mentioned in the foregoing description, compared to the encoding method mentioned earlier in FIG. 3, according to the present invention, a method of generating a video signal to which ISP is to be applied has been changed. According to the encoding method of FIG. 3, since a reconstructed signal is generated through FOR coding and a video signal to which ISP is to be applied is generated using the generated reconstructed signal, it is necessary to have a process of converting an input signal to frequency domain and converting the frequency domain to a pixel domain (or a spatial domain) again. Hence, the encoding process is sequentially performed in a manner of being divided into a plurality of layers (e.g., FOR coding and SOR coding). On the other hand, according to the present invention, since a video signal to which ISP is to be applied is generated through filtering in a pixel domain (or a spatial domain), the process can be implemented by a single layer and can be configured by a single encoder/decoder.

According to the encoding method of the present invention, it is able to generate a low frequency component (e.g., lowfreq input) and a high frequency component (e.g., highfreq input) of the current block almost at the same time without a processing delay by performing filtering on the current block (e.g., filter A). In addition, coding for the low frequency component of the current block and coding for the high frequency component (using ISP) can be performed in parallel.

According to the encoding method of the present invention, an input image can be divided into a high frequency component and a low frequency component and prediction, conversion, and quantization can be performed in accordance with characteristics of each frequency domain. And, according to the encoding method of the present invention, since a single bit stream is generated only, it is able to prevent coding efficiency from being degraded due to syntax duplication.

Figure 9:
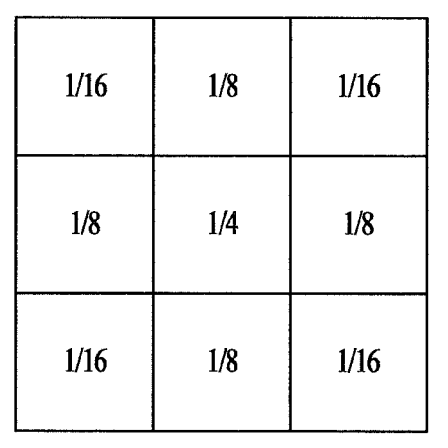

FIG. 9 illustrates a filter capable of being applied to the present invention. According to the present invention, filtering is performed on a video signal in a pixel domain (or a spatial domain) to divide the video signal into a sample corresponding to a low frequency component and a sample corresponding to a high frequency component. As a filter for frequency division, it may use a filter (e.g., filter A) for an original video signal and a filter for a reconstructed video signal.

According to the present invention, it may use a low pass filter as a filter for frequency division. For example, it may use a Gaussian filter. FIG. 9 illustrates a 3×3 Gaussian filter, by which the present invention may be non-limited. A coefficient and a size of a filter can be changed in various ways according to a type and a size of an image. If the filter illustrated in FIG. 9 is applied, it may be able to obtain a sample corresponding to a low frequency component of an input sample according to Equation 2.

$$L(x, y) = 1/16^*O(x-1, y-1) + 1/8^*O(x, y-1) + \qquad \text{[Equation 2]}$$
$$1/16^*O(x+1, y-1) + 1/8^*O(x-1, y) + 1/4^*O(x, y) +$$
$$1/8^*O(x+1, y) + 1/16^*O(x-1, y+1) +$$
$$1/8^*O(x, y+1) + 1/16^*O(x+1, y+1)$$

In Equation 2, O(x,y) indicates a sample located at a (x,y) position of an original video signal or a reconstructed video signal and L(x,y) indicates a sample of a low frequency component located at (x,y) position. A frequency division filter according to the present invention applies a Gaussian filter to a target sample O(x,y) and neighboring samples adjacent to the target sample to generate a low frequency component sample of the original video signal or the reconstructed video signal (e.g., lowfreq input or lowfreq ref of FIG. 8)

A high frequency component sample of the original video signal or the reconstructed video signal (e.g., highfreq input or highfreq ref of FIG. 8) can be obtained based on a difference between the original video signal or the reconstructed video signal and the low frequency component sample L(x,y). For example, the high frequency component sample of the original video signal or the reconstructed video signal (e.g., highfreq input or highfreq ref of FIG. 8) can be generated by Equation 3. In Equation 3, H(x,y) indicates a high frequency component sample located at (x,y) position.

$$H(x,y)=O(x,y)-L(x,y) \quad \text{[Equation 3]}$$

A filter (e.g., filter A) for the original video signal can be set in a manner of being identical or different to/from a filter (e.g., Filter B) for the reconstructed video signal. If the filters are identically set, a filter coefficient and a size (or kernel size) of each filter may be the same. If the filters are differently configured, the filter coefficient and/or the size (or kernel size) of each filter may be different from each other. In addition, a different type of a low pass filter can be used for a filter for an original video signal (e.g., filter A) and a filter for a reconstructed video signal (e.g., filter B) according to a characteristic of each video signal.

Figure 10A:
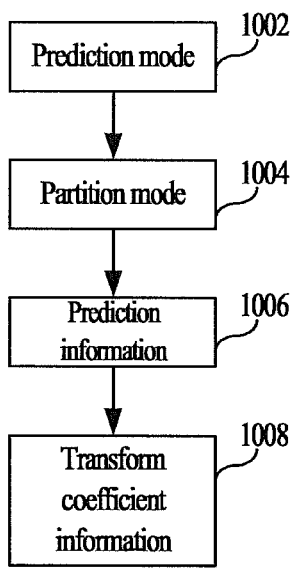
FIGS. 10A and 10B illustrate information included in a bit stream generated according to the present invention.
Figure 10B:
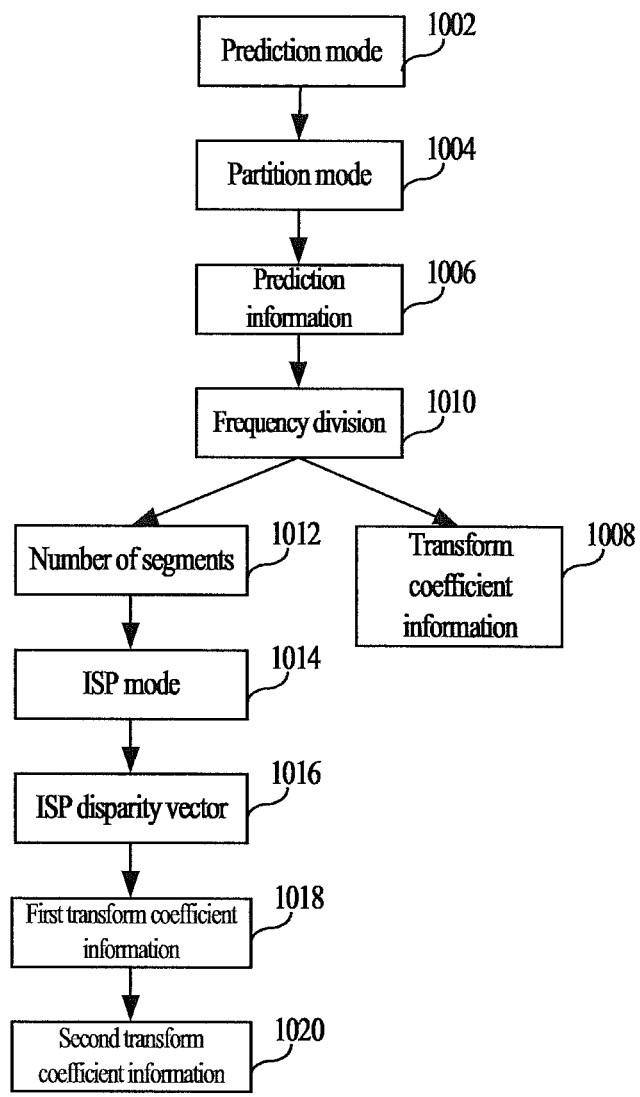

FIGS. 10A and 10B illustrate information included in a bit stream generated according to the present invention. The individual information included in the bit stream can be referred to as a syntax (or syntax element) in the present specification. FIG. 10A illustrates a syntax of a bit stream which is generated when a current block (e.g., a coding block) is encoded according to the legacy encoding method (e.g., refer to FIG. 1) and FIG. 10B illustrates a syntax of a bit stream which is generated when a current block (e.g., a coding block) is encoded by the encoding method according to the present invention. In the aspect of an encoder side, each of the information can be stored in the bit stream through entropy coding according to a predefined order. In the aspect of a decoder side, information corresponding to each syntax can be obtained from the bit stream through entropy decoding according to the above-mentioned order. The present invention is not restricted by the order illustrated in FIGS. 10A and 10B and the syntax order can be changed.

Referring to FIG. 10A, the bit stream generated according to the legacy encoding method (e.g., refer to FIG. 1) can include prediction mode information 1002, partition mode information 1004, prediction information 1006, transform coefficient information 1008, and the like. The prediction mode information 1002 indicates whether a current block is coded in an intra-prediction mode or an inter-prediction mode. For example, if the prediction mode information 1002 has a first value (e.g., 0), it indicates that the current block is coded in the inter-prediction mode. If the prediction mode information 1002 has a second value (e.g., 1), it may indicate that the current block is coded in the intra-prediction mode. The first value and the second value may be interchanged. For example, the prediction mode information 1002 can be named as pred_mode_flag.

The partition mode information 1004 indicates a partitioning mode of a current block (e.g., a coding block). The partition mode information 1004 may indicate various partitioning modes according to a prediction mode determined by the prediction mode information 1002. For example, the partition mode information 1004 can be named as part_mode. Table 1 illustrates a prediction mode and a partitioning mode according to the partition mode information 1004.

TABLE 1

| Prediction mode | Partition mode information (1104) | Partitioning mode |
|---|---|---|
| INTRA mode | 0 | PART_2N×2N |
| | 1 | PART_N×N |
| INTER mode | 0 | PART_2N×2N |
| | 1 | PART_2N×N |
| | 2 | PART_N×2N |
| | 3 | PART_N×N |
| | 4 | PART_2N×nU |
| | 5 | PART_2N×nD |
| | 6 | PART_nL×2N |
| | 7 | PART_nR×2N |

In Table 1, PART_2N×2N, PART_2N×N, PART_N×2N, and PART_N×N correspond to a symmetrical partitioning mode and PART_2N×nU, PART_2N×nD, PART_nL×2N, and PART_nR×2N correspond to an asymmetric partitioning mode.

In Table 1, assume that a size of a current block corresponds to 2N×2N. In this case, PART_2N×2N indicates that a size of a partition corresponds to 2N×2N and the current block is not partitioned. PART_N×N indicates that a size of a partition corresponds to N×N and a current block is partitioned into four partitions having a half in height and width (i.e., N×N). PART_2N×N indicates that a size of a partition corresponds to 2N×N and a current block is partitioned into two partitions respectively having a half in height and the same height (i.e., 2N×N). PART_N×2N indicates that a size of a partition corresponds to N×2N and a current block is partitioned into two partitions respectively having the same height and a half in width (i.e., N×2N).

PART_2N×nU indicates that a current block is partitioned into two partitions. In this case, an upper partition among the two partitions has the same width and ¼ height of the current block (i.e., 2N×(N/2)) and a lower partition among the two partitions has the same width and ¾ height of the current block (i.e., 2N×(3N/2)). PART_2N×nD indicates that a current block is partitioned into two partitions. In this case, an upper partition has the same width and ¾ height of the current block (i.e., 2N×(3N/2)) and a lower partition has the same width and ¼ height of the current block (i.e., 2N×(N/2)). PART_nR×2N indicates that a current block is partitioned into two partitions. In this case, the left partition among the two partitions has ¾ width and the same height of the current block (i.e., (3N/2)×2N) and the right partition among the two partitions has ¼ height and the same width of the current block (i.e., (N/2)×2N). PART_nL×2N indicates that a current block is partitioned into two partitions. In this case, the left partition among the two partitions has ¼ width and the same height of the current block (i.e., (N/2)×2N) and the right partition among the two partitions has ¾ height and the same width of the current block (i.e., (3N/2)×2N).

The prediction information 1006 may have different syntax depending on a prediction mode. If the prediction mode corresponds to an intra mode, the prediction information 1006 can includes information (e.g., prev_intra_luma_pred_flag, mpm_idx, rem_intra_luma_pred_mode) indicating an intra prediction mode for luminance (luma) samples of a current block and information (e.g., intra_chroma_pred_mode) indicating an intra prediction mode for chroma (or chrominance or color difference) samples of the current block.

If the prediction mode corresponds to an inter mode, the prediction information 1006 can include at least one selected from the group consisting of information (e.g., mvp_l0_flag)

indicating an index of a forward direction (e.g., list 0) motion vector candidate for each partition of a current block, information (e.g., mvp_l1_flag) indicating an index of a backward direction (e.g., list 1) motion vector candidate, infonnation (e.g., merge_flag) indicating whether or not inter prediction parameters for a partition of a current block are derived from a neighboring partition, information (e.g., merge_idx) indicating an index of a merge candidate among a list of merge candidates, information (e.g., inter_pred_idc) indicating prediction to be used for a corresponding partition among forward direction (e.g., list 0) prediction, backward direction prediction, and bidirectional prediction, information (e.g., ref_idx_l0) indicating a list 0 reference picture index for a corresponding partition, and information (e.g., e.g., ref_idx_l1) indicating a list 1 reference picture index for a corresponding partition.

The transform coefficient information 1008 can include syntaxes that indicating quantized transform coefficient information.

Referring to FIG. 10B, a bit stream according to the present invention can include not only syntax according to the legacy encoding method but also additional syntax. Specifically, the bit stream according to the present invention can include at least one selected from the group consisting of frequency division flag information 1010, segment number information 1012, ISP mode information 1014, ISP disparity vector information 1016, first transform coefficient information 1018, and second transform coefficient information 1020.

The frequency division flag information 1010 indicates whether or not a frequency division coding scheme according to the present invention is applied. If the frequency division flag information 1010 has a first value (e.g., 1), it indicates that the frequency division coding scheme according to the present invention is applied. The bit stream can include syntax for supporting the frequency division coding scheme according to the present invention. If the frequency division flag information 1010 has a second value (e.g., 0), it indicates that the frequency division coding scheme according to the present invention is not applied and the bit stream can include transform coefficient information 1008 according to the legacy method. The first value and the second value can be interchanged. For example, the frequency division flag information 1010 can be named as freq_div_flag.

If the frequency division flag information 1010 has a first value (e.g., 1), a bit stream can include segment number information 1012, ISP mode information 1014, ISP disparity vector information 1016, first transform coefficient information 1018, and second transform coefficient information 1020.

The segment number information 1012 indicates the number of segments included in a stripe of a current block. For example, the segment number information 1012 may have a value of (the number of segments included in the stripe of the current block−1). In this case, if the stripe of the current block is divided into four segments, the segment number information 1012 may have a value of 3. Segments corresponding to the number indicated by the segment number information 1012 may exist in the stripe of the current block. For each segment, such syntaxes as the ISP disparity vector information 1016, the first transformation coefficient information 1018, the second transform coefficient information 1020 1020, etc. may exist. For example, if the segment number information 1012 has a value of (N−1), since the stripe of the current block is divided into N segments, syntaxes such as the ISP disparity vector information 1016, the first transform coefficient information 1018, the second transform coefficient information 1020, and the like may exist for each of the N number of segments. Or, the ISP disparity vector information 1016 may exist for each segment and the first transform coefficient information 1018 and the second transform coefficient information 1020 may exist for all of the N number of segments. And, if the segments have a variable length, the segment number information 1012 can further include information indicating the length of each segment.

The ISP mode information 1014 indicates an ISP mode for the current block. The ISP mode indicates a scanning order for the current block. More specifically, the ISP mode indicates a scanning order for converting samples of a block into a one-dimensional sample array (or stripe) or converting a one-dimensional sample array (or stripe) into a block (e.g., refer to FIGS. 5A to 5F). In the present specification, the ISP mode can be referred to as a scan mode or a stripe scan mode. Various ISP modes may exist depending on a size of the current block and each ISP mode can be configured to have a unique value. For example, the ISP mode information 1014 can be named as ISP_mode or interframe_stripe_prediction mode.

Since the ISP mode may have a high value depending on the size of the current block, it may predict the ISP mode of the current block to improve coding efficiency. For example, the ISP mode of the current block can be predicted using an ISP mode (e.g., refer to the step S406 of FIG. 4 and FIG. 6A) of a reference block. In this case, the ISP mode of the reference block can be used as a prediction ISP mode of the current block and the ISP mode information 1014 may indicate a difference between the ISP mode of the reference block and the ISP mode of the current block. Hence, if the ISP mode information 1014 is obtained from a bit stream and the ISP mode of the reference block is used as the prediction ISP mode, it is able to obtain the ISP mode for the current block.

If motion information on a low frequency component and motion information on a high frequency component are separately transmitted through a bit stream, a reference block can be obtained from a reference picture using the motion information on the high frequency component. Or, if either the motion information on the low frequency component or the motion information on the high frequency component is transmitted through the bit stream only, a reference block can be obtained from a reference picture using single motion information. If an ISP mode for the obtained reference block is determined (e.g., refer to the step S406 of FIG. 4 and FIG. 6A), it is able to predict the ISP mode for the current block based on the determined ISP mode. As a different example, it is able to predict the ISP mode of the current block using an ISP mode of a block including a motion vector predictor (or predicted motion vector) of the current block. As a further different example, if the motion information of the current block is derived from a neighboring block in the current picture or a block corresponding to the current block in a picture different from the current picture in time, it is able to predict the ISP mode of current the block using the ISP mode of the block or it may use the ISP mode of the block as the ISP mode of the current block without obtaining the ISP mode information 1014 of the current block from the bit stream.

The ISP disparity vector information 1016 may indicate a disparity vector for a specific segment. The disparity vector may indicate a difference or displacement between a start position of the segment and a start position of a prediction sample of a reference sample array (or stripe) (e.g., refer to FIG. 7). A decoding device can obtain a prediction sample of a corresponding segment from a position indicated by an ISP disparity vector in a stripe of a reference block. For example, the ISP disparity vector information 1016 can be named as ISP_disparity or interframe_stripe_prediction_ disparity.

It may perform prediction on an ISP variation vector. In this case, the ISP disparity vector information 1016 can include an index for an ISP disparity vector candidate and an ISP disparity vector difference. The ISP disparity vector difference can indicate a difference between a prediction ISP disparity vector and an ISP disparity vector of a current block. For example, a decoding device may construct a list of ISP disparity vector candidates of a neighboring block adjacent to the current block and select an ISP disparity vector candidate indicated by an index of the ISP disparity vector candidate as the prediction ISP disparity vector from the list of the ISP disparity vector candidates. Subsequently, the decoding device can obtain the ISP disparity vector using (for example, summing) a difference between the prediction ISP disparity vector and the ISP disparity vector. Alternatively, as a different example, if the motion information on the current block is derived from a neighboring block in the current picture or a block of a position corresponding to the current block in a picture different from the current picture, an ISP disparity vector of the block can be used as the ISP disparity vector for the current block.

The first transform coefficient information 1018 includes quantized transform coefficient information (e.g., lowfreq quantized coeff of FIG. 8) on a low frequency component of a current block and the second transform coefficient information 1020 includes quantized transform coefficient information (e.g., highfreq quantized coeff of FIG. 8) on a high frequency component of the current block. The sequence of the first transform coefficient information 1018 and the second transform coefficient information 1020 can be interchanged.

Figure 11:
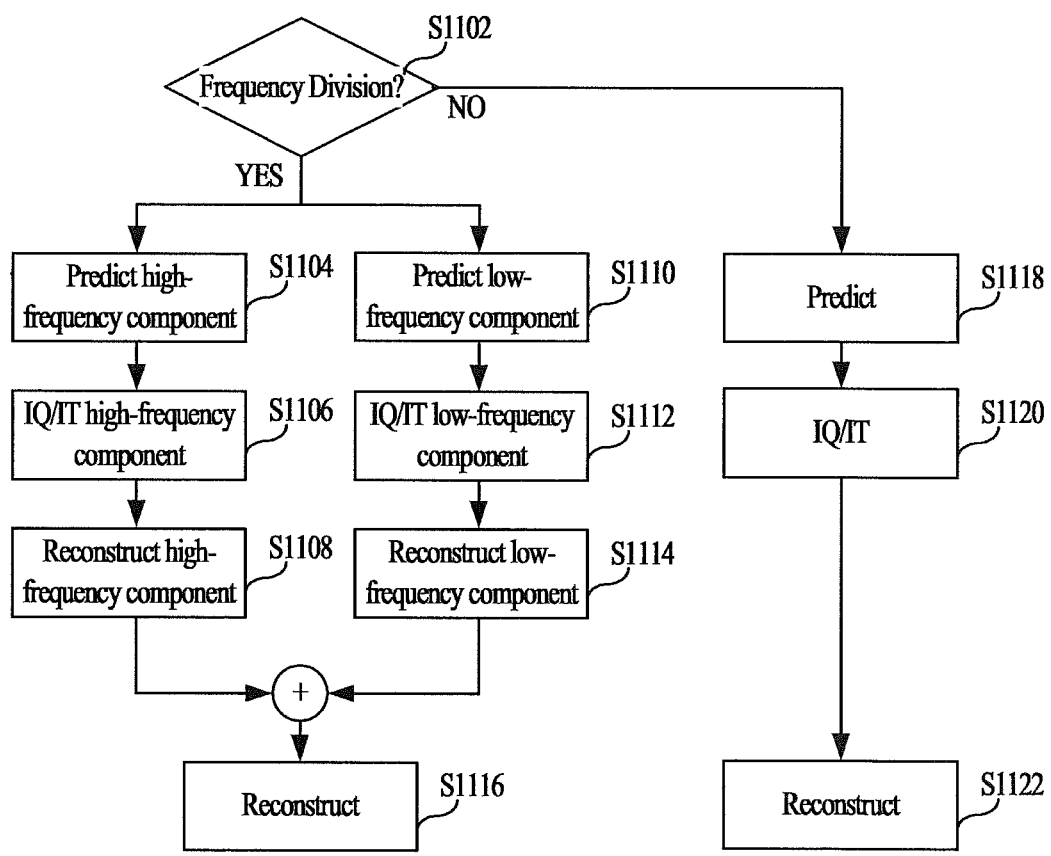
FIG. 11 illustrates a flowchart for a decoding method according to a frequency division coding scheme.

FIG. 11 illustrates a flowchart for a decoding method according to a frequency division coding scheme.

In the step S1102, a decoding device can obtain frequency division flag information (e.g., 1010) on a current block from a bit stream. If the frequency division flag information indicates a decoding process according to the legacy method, the decoding device may proceed to the step S1118. If the frequency division flag information indicates a decoding process according to the present invention, the decoding device may proceed to the steps S1104 and S1110.

In the step S1104, the decoding device obtains segment number information (e.g., 1012) from the bit stream and performs the steps S1104 to S1108 on each of the segments indicated by the segment number information.

In the step S1104, at least one prediction sample corresponding to a high frequency component of the current block is obtained. In the present specification, a prediction sample corresponding to the high frequency component of the current block can be referred to as a first prediction sample. The decoding device can obtain motion information (e.g., a motion vector, a reference picture index, etc.) from the bit stream to obtain the first prediction sample. Or, if motion information of the current block is derived from a neighboring block adjacent to the current block in a current picture or a block of a position corresponding to the current block in a picture different from the current picture in time, motion information of the block can be used as the motion information of the current block. For example, the decoding device can obtain at least one reference sample based on a motion vector of a reference picture indicated by a reference picture index among a reference picture list. The obtained at least one reference sample can be referred to as a first reference sample and may correspond to a reference block. The first reference sample can be obtained from a reference picture different from the current picture including the current block.

In order to obtain a high frequency component from the obtained first reference sample, filtering can be performed on the first reference sample. The filtering can be performed by applying such a low pass filter as a Gaussian filter (refer to filter B of FIG. 8 and FIG. 9). The decoding device can obtain a difference between the first reference sample and a filtered first reference sample and convert the difference into a reference sample array. In this case, the difference corresponds to a reference block and may correspond to a two-dimensional sample array (e.g., refer to the description related to the step S406 of FIG. 4). The reference sample array corresponds to a reference stripe and may correspond to a one-dimensional sample array (e.g., refer to the step S408 of FIG. 4). The decoding device may deteiinine an ISP mode for the difference to convert the difference into a reference sample array (e.g., refer to the step S406 of FIG. 4). The decoding device may convert the difference into the reference sample array according to the determined ISP mode.

Subsequently, the decoding device can obtain ISP disparity vector information (e.g., 1016 of FIGS. 10A and 10B) from the bit stream. The decoding device obtains an ISP disparity vector for a corresponding segment based on the obtained ISP disparity vector information and may be able to obtain a first prediction sample from the reference sample array using the obtained ISP disparity vector. For example, in order to obtain the ISP disparity vector, it may apply various methods mentioned earlier with reference to the ISP disparity vector information 1016 of FIGS. 10A and 10B. And, if the ISP disparity vector indicates a fractional position in the reference sample array, the samples included in the reference sample array can be interpolated to obtain a prediction sample. For example, prediction samples can be obtained by linearly interpolating two samples closest to a fractional position. As a different example, prediction samples can be obtained in a manner that a filter of at least four taps is applied to at least four samples closest to the fractional position.

If there exist at least two segments for the current block, it is able to obtain ISP disparity vector information for each of the segments and obtain prediction samples based on the obtained ISP disparity vector information.

In the step S1106, the decoding device obtains transform coefficient information (e.g., 1020 of FIGS. 10A and 10B, highfreq quantized coeff of FIG. 8) on the high frequency component from the bit stream and performs inverse transform (IT) based on the obtained transform coefficient information to obtain residual data (e.g., highfreq residual of FIG. 8) for the high frequency component of the current block. The residual data for the high frequency component of the current block can be referred to as a first residual data. More specifically, the first residual data can be obtained by performing inverse quantization (IQ) and inverse transform (IT) on the obtained transform coefficient information.

In the step S1108, it may be able to obtain a reconstructed sample corresponding to the high frequency components of the current block based on the prediction sample obtained in the step S1104 and the residual data obtained in the step S1106 for each segment. For example, the reconstructed sample for each segment can be obtained by summing up the prediction sample obtained in the step S1104 and the residual data obtained in the step S1106. The reconstructed sample for each segment is concatenated in a predetermined order to reconstruct a sample array (or a stripe) for the high frequency components of the current block. The decoding device obtains ISP mode information (e.g., 1014 of FIGS. 10A and 10BS) for the current block and sequentially arranges the reconstructed sample array (or stripe) according to a scanning order (or ISP mode) indicated by the ISP mode information to switch to a two-dimensional array (or block).

The decoding device proceeds to the step S1110 and may be then able to reconstruct the low frequency component of the current block.

In the step S1110, a prediction sample for the low frequency component of the current block is obtained. In the present specification, the prediction sample for the low frequency component of the current block can be referred to as a second prediction sample. In order to obtain the second prediction sample, it may perform a prediction scheme according to the legacy method. For example, if prediction mode information (e.g., 1002 of FIGS. 10A and 10B) of the current block indicates an intra mode, the decoding device obtains intra prediction mode information from the bit stream and may be able to obtain a reference sample for a low frequency component data of the current block from a reconstructed pixel in a current picture based on the obtained intra prediction mode information. As a different example, if the prediction mode information (e.g., 1002 of FIGS. 10A and 10B) of the current block indicates an inter mode, the decoding device obtains motion information and may be able to obtain a reference sample for a low frequency component data of the current block from a reconstructed pixel in a reference picture different from a current picture in time based on the obtained motion information.

The decoding device may perform filtering on the obtained reference sample to obtain a prediction sample for the low frequency component of the current block. The filtering can be performed using such a low pass filter as a Gaussian filter (e.g., refer to filter B of FIG. 8 and FIG. 9). A filter used for obtaining the first prediction sample and a filter used for obtaining the second prediction sample are identical to each other, by which the present invention may be non-limited. Filters different from each other can be used as well.

In the step S1112, the decoding device obtains transform coefficient information (e.g., 1018 of FIGS. 10A and 10B, lowfreq quantized coeff of FIG. 8) on the low frequency component of the current block from the bit stream and performs inverse transform (IT) based on the obtained transform coefficient information to obtain residual data (e.g., lowfreq residual of FIG. 8) for the low frequency components of the current block. More specifically, the residual data for the low frequency component of the current block can be obtained by performing inverse quantization (IQ) and inverse transform (IT) on the transform coefficient information obtained from the bit stream.

In the step S1114, it may be able to obtain a reconstructed sample for the low frequency component of the current block based on the prediction sample obtained in the step S1110 and the residual data obtained in the step S1112. For example, the reconstructed sample for the low frequency component of the current block can be obtained by summing up the prediction sample obtained in the step S1110 and the residual data obtained in the step S1112.

The decoding device can reconstruct the current block by summing up the reconstructed samples for the high frequency component of the current block obtained in the step S1108 and the reconstructed samples for the low frequency component of the current block obtained in the step S1114 [S1116].

If the frequency division flag information indicates the decoding process (e.g., refer to FIG. 2) according to the legacy method in the step S1102, the decoding device proceeds to the step S1118 and can perform the decoding process according to the legacy method. The step S1118 may correspond to a process of obtaining a prediction sample through intra prediction 210 or inter prediction 212 in the legacy decoding method. The step S1120 may correspond to a process of obtaining transform coefficient information (e.g., 204) from the bit stream and obtaining residual data by performing inverse quantization 206 and inverse transformation 208 on the obtained transform coefficient information. The step S1122 may corresponds to a process of reconstructing 216 the current block based on a predicted value and the residual data.

According to the decoding process of the present invention, since a single bit stream is received and a high frequency component and a low frequency component of a reference picture are generated in a pixel domain (or spatial domain) via filtering, a separate storage space for the low frequency component and the high frequency component of the reference picture is not required. In addition, since the high frequency component and the low frequency component of the reference picture are generated through filtering in the pixel domain (or the spatial domain), processing delay is low and implementation for parallel processing is available.

Figure 12:
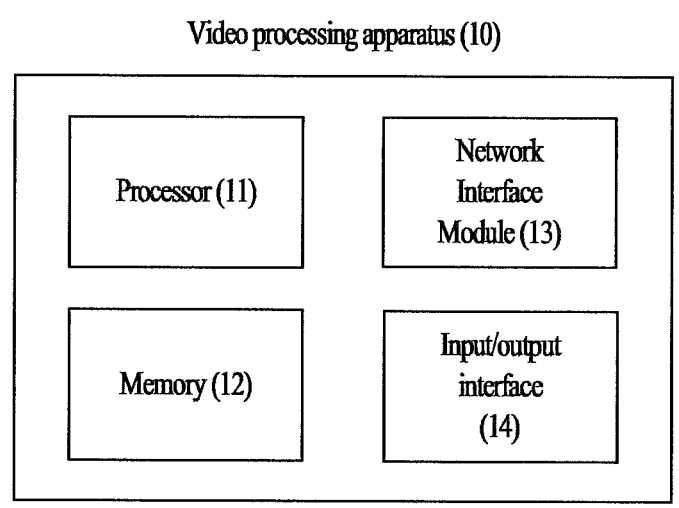
FIG. 12 illustrates a block diagram of an image processing apparatus to which the present invention can be applied.

FIG. 12 illustrates a block diagram to which the present invention can be applied. The video processing apparatus may include an encoding apparatus and/or a decoding apparatus of a video signal. For example, the video processing apparatus to which the present invention can be applied may include a mobile terminal such as a smart phone, a mobile equipment such as a laptop computer, a consumer electronics such as a digital TV, a digital video player, and etc.

A memory 12 may store program for processing and controlling by a processor 11, and may store a coded bitstream, a reconstructed image, control information, and the like. Further, the memory 12 may be used as a buffer for various video signals. The memory 12 may be implemented as a storage device such as a ROM (Read Only Memory), RAM (Random Access Memory), EPROM (Erasable Programmable Read Only Memory), EEPROM (Electrically Erasable Programmable Read-Only Memory), a flash memory, SRAM (Static RAM), HDD (Hard Disk Drive), SSD (Solid State Drive), and etc.

The processor 11 controls operations of each module in the video processing apparatus. The processor 11 may perform various control functions to perform encoding/decoding according to the present invention. The processor 11 may be referred to as a controller, a microcontroller, a microprocessor, a microcomputer, or etc. The processor 11 may be implemented as a hardware or a firmware, a software, or a combination thereof. When the present invention is implemented using a hardware, the processor 11 may comprise ASIC (application specific integrated circuit), DSP (digital signal processor), DSPD (digital signal processing device), PLD (programmable logic device), FPGA (field programmable gate array), or the like. Meanwhile, when the present invention is implemented using a firmware or a software, the firmware or software may comprise modules, procedures, or functions that perform functions or operations according to the present invention. The firmware or software configured to perform the present invention may be implemented in the processor 11 or may be stored in the memory 12 and executed by the processor 11.

In addition, the apparatus 10 may optionally include a network interface module (NIM) 13. The network interface module 13 may be operatively connected with the processor 11, and the processor 11 may control the network interface module 13 to transmit or receive wireless/wired signals carrying information, data, a signal, and/or a message through a wireless/wired network. For example, the network interface module 13 may support various communication standards such as IEEE 802 series, 3GPP LTE(-A), Wi-Fi, ATSC (Advanced Television System Committee), DVB (Digital Video Broadcasting), and etc, and may transmit and receive a video signal such as a coded bitstream and/or control information according to the corresponding communication standard. The network interface module 13 may not be included as necessary.

In addition, the apparatus 10 may optionally include an input/output interface 14. The input/output interface 14 may be operatively connected with the processor 11, and the processor 11 may control the input/output interface 14 to input or output a control signal and/or a data signal. For example, the input/output interface 14 may support specifications such as USB (Universal Serial Bus), Bluetooth, NFC (Near Field Communication), serial/parallel interface, DVI (Digital Visual Interface), HDMI (High Definition Multimedia Interface) so as to be connected with input devices such as a keyboard, a mouse, a touchpad, a camera and output devices such as a display.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention can be applied to a video processing apparatus.

What is claimed is:

1. A method for decoding a video signal by a decoding device, the method comprising:
   obtaining at least one first reference sample from a first reference picture based on a first motion vector;
   generating a filtered first reference sample by applying a filter to the obtained first reference sample;
   generating a reference sample array based on a difference between the obtained first reference sample and the filtered first reference sample;
   obtaining first disparity vector information from the video signal;
   obtaining a first prediction sample from the generated reference sample array based on the first disparity vector information; and
   reconstructing a current block based on the first prediction sample.

2. The method of claim 1, further comprising:
   obtaining inter-frame stripe prediction (ISP) mode information from the video signal,
   wherein the ISP mode information indicates a scanning order for the current block, and
   wherein reconstructing the current block includes:
   reconstructing a one-dimensional sample array for the current block based on the first prediction sample; and
   converting the reconstructed one-dimensional sample array to a two-dimensional sample array according to the scanning order indicated by the ISP mode information.

3. The method of claim 1, further comprising:
   obtaining segment number information from the video signal, wherein the segment number information indicates a number of segments contained in a one-dimensional sample array for the current block; and
   based on the number of segments being greater than 1, obtaining second disparity vector information from the video signal, and obtaining a second prediction sample from the reference sample array based on the second disparity vector information,
   wherein the current block is reconstructed based on the first prediction sample and the second prediction sample.

4. The method of claim 1, wherein obtaining the at least one first reference sample includes:
   obtaining first motion information from the video signal; and
   obtaining a first motion vector and a first reference picture index from the obtained first motion information, wherein the first reference picture index indicates the first reference picture within a reference picture list.

5. The method of claim 1, wherein generating the reference sample array includes:
   converting the difference to a first one-dimensional sample array according to a first scanning order;
   obtaining a sum of an absolute value of a difference between two adjacent samples within the first one-dimensional sample array;
   converting the difference to a second one-dimensional sample array according to a second scanning order;
   obtaining a sum of an absolute value of a difference between two adjacent samples within the second one-dimensional sample array;

comparing the sum of the absolute value for the first one-dimensional sample array with the sum of the absolute value for the second one-dimensional sample array; and determining a one-dimensional sample array having a smaller sum of the absolute value as the reference sample array according to a result of the comparison.

6. The method of claim 1, wherein the disparity vector information indicates a disparity vector for a specific segment in the current block, and wherein the disparity vector shows a difference between a start sample position of the specific segment and a start sample position of the first prediction sample in the reference sample array.

7. The method of claim 1, further comprising:
obtaining first transform coefficient information from the video signal; and
generating first residual data by performing an inverse transform based on the obtained first transform coefficient information,
wherein reconstructing the current block includes obtaining a first reconstructed sample of the current block using the first prediction sample and the first residual data.

8. The method of claim 7, further comprising:
obtaining at least one second reference sample from a second reference picture based on a second motion vector;
generating a second prediction sample by applying the filter to the obtained second reference sample;
obtaining second transform coefficient information from the video signal;
generating second residual data by performing an inverse transform based on the obtained second transform coefficient information; and
obtaining a second reconstructed sample of the current block based on the second prediction sample and the second residual data.

9. The method of claim 8, wherein reconstructing the current block includes reconstructing the current block by adding the first reconstructed sample and the second reconstructed sample of the current block.

10. The method of claim 8, wherein obtaining the at least one second reference sample includes:
obtaining second motion information from the video signal; and
obtaining the second motion vector and a second reference picture index from the obtained second motion information, wherein the second reference picture index indicates the second reference picture within a reference picture list.

11. The method of claim 8, wherein the first reconstructed sample corresponds to a high frequency component of the current block, and the second reconstructed sample corresponds to a low frequency component of the current block.

12. The method of claim 1, wherein the filter comprises a Gaussian filter.

13. The method of claim 1, wherein the filtered first reference sample is generated according to the following equation:

$$L(x, y) = 1/16^*O(x-1, y-1) + 1/8^*O(x, y-1) + 1/16^*O(x+1, y-1) + \\ 1/8^*O(x-1, y) + 1/4^*O(x, y) + 1/8^*O(x+1, y) + \\ 1/16^*O(x-1, y+1) + 1/8^*O(x, y+1) + 1/16^*O(x+1, y+1)$$

wherein x indicates a horizontal coordinate of a sample, y indicates a vertical coordinate of a sample, $O(x,y)$ indicates a sample corresponding to (x,y) position among the at least one first reference sample, and $L(x,y)$ indicates a sample corresponding to (x,y) position among the filtered first reference sample.

14. The method of claim 13, wherein the difference is generated according to the following equation:

$$H(x,y)=O(x,y)-L(x,y)$$

wherein $H(x,y)$ indicates a sample corresponding to (x,y) position among the difference.

15. A decoding device configured to decode a video signal, the decoding device comprising:
a memory configured to store at least one picture; and
a processor operatively connected with the memory and configured to:
obtain at least one first reference sample from a first reference picture based on a first motion vector;
generate a filtered first reference sample by applying a filter to the obtained first reference sample;
generate a reference sample array based on a difference between the obtained first reference sample and the filtered first reference sample;
obtain first disparity vector information from the video signal;
obtain a first prediction sample from the generated reference sample array based on the first disparity vector information; and
reconstruct a current block based on the first prediction sample.

16. The decoding device of claim 15, wherein the processor is further configured to:
obtain inter-frame stripe prediction (ISP) mode information from the video signal,
wherein the ISP mode information indicates a scanning order for the current block, and
wherein the processor is configured to reconstruct the current block by:
reconstructing a one-dimensional sample array for the current block based on the first prediction sample; and
converting the reconstructed one-dimensional sample array to a two-dimensional sample array according to the scanning order indicated by the ISP mode information.

17. The decoding device of claim 15, wherein the processor is further configured to:
obtain segment number information from the video signal, wherein the segment number information indicates a number of segments contained in a one-dimensional sample array for the current block;
based on the number of segments being greater than 1, obtain second disparity vector information from the video signal, and obtain a second prediction sample from the reference sample array based on the second disparity vector information,
wherein the current block is reconstructed based on the first prediction sample and the second prediction sample.

18. The decoding device of claim 15, wherein the processor is configured to obtain the at least one first reference sample by:
obtaining first motion information from the video signal; and
obtaining the first motion vector and a first reference picture index from the obtained first motion information, wherein the first reference picture index indicates the first reference picture within a reference picture list.

19. The decoding device of claim 15, wherein the processor is configured to generate the reference sample array by:
- converting the difference to a first one-dimensional sample array according to a first scanning order;
- obtaining a sum of an absolute value of a difference between two adjacent samples within the first one-dimensional sample array;
- converting the difference to a second one-dimensional sample array according to a second scanning order;
- obtaining a sum of an absolute value of a difference between two adjacent samples within the second one-dimensional sample array;
- comparing the sum of the absolute value for the first one-dimensional sample array with the sum of the absolute value for the second one-dimensional sample array; and
- determining a one-dimensional sample array having a smaller sum of the absolute value as the reference sample array according to a result of the comparison.

20. The decoding device of claim 15, wherein the disparity vector information indicates a disparity vector for a specific segment in the current block, and
- wherein the disparity vector shows a difference between a start sample position of the specific segment and a start sample position of the first prediction sample in the reference sample array.

* * * * *